United States Patent
Parker et al.

(10) Patent No.: US 12,381,778 B2
(45) Date of Patent: Aug. 5, 2025

(54) MULTI-TIERED RECONCILIATION OF NETWORK FUNCTIONS

(71) Applicant: Microsoft Technology Licensing, LLC, Redmond, WA (US)

(72) Inventors: Ronald Mark Parker, Manchester, MA (US); Mark Gordon Libby, Groton, MA (US); Michael Anthony Brown, McKinney, TX (US); Haibo Qian, Frisco, TX (US); Rahul Bose, Westford, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 314 days.

(21) Appl. No.: 18/091,165

(22) Filed: Dec. 29, 2022

(65) Prior Publication Data
US 2024/0223446 A1 Jul. 4, 2024

(51) Int. Cl.
*H04L 41/08* (2022.01)
*H04L 41/0806* (2022.01)
*H04W 24/02* (2009.01)

(52) U.S. Cl.
CPC ......... *H04L 41/0806* (2013.01); *H04W 24/02* (2013.01)

(58) Field of Classification Search
CPC .................................................. H04L 41/0806
See application file for complete search history.

(56) References Cited

U.S. PATENT DOCUMENTS

| | | |
|---|---|---|
| 6,836,798 B1 | 12/2004 | Adams |
| 11,240,107 B1 | 2/2022 | Gupta |
| 2021/0406053 A1 | 12/2021 | Mani et al. |
| 2024/0243964 A1* | 7/2024 | Venkataraghavan ........ H04L 41/0816 |

FOREIGN PATENT DOCUMENTS

WO 2021150366 A1 7/2021

OTHER PUBLICATIONS

International Search Report and Written Opinion received for PCT Application No. PCT/US23/036983, mailed on Feb. 12, 2024, 17 pages.
Mehmood, et al., "Intent-driven autonomous network and service management in future cellular networks: A structured literature review", Computer Networks, Jan. 2023, 19 pages.

* cited by examiner

*Primary Examiner* — Curtis B Odom
(74) *Attorney, Agent, or Firm* — Ray Quinney & Nebeker P.C.; James S. Bullough

(57) ABSTRACT

The present disclosure relates to systems, methods, and computer readable media for managing and maintaining deployments of configurations on network functions in a telecommunications network. In particular, examples herein relate to implementations of a configuration management system and reconciliation agents that cooperatively perform multi-tiered reconciliation of configuration states for deployments of network functions. The systems described herein can perform multiple levels of reconciliation checks on a plurality of network functions to ensure that configurations of the network functions are effectively maintained and consistent with a desired state (e.g., a goal state) of the deployment(s) of network functions.

20 Claims, 11 Drawing Sheets

MULTI-TIERED RECONCILIATION OF NETWORK FUNCTIONS

BACKGROUND

Cellular networks can provide computing devices (e.g., mobile devices) with access to services available from one or more data networks. A cellular network is typically distributed over geographical areas that often include base stations, core networks, and/or edge networks that collectively provide a variety of services and coverage to end-user devices (e.g., mobile devices). The devices of the cellular network provide reliable access to a data network by mobile devices over a wide geographic area. In many instances these cellular networks provide mobile devices access to the cloud.

As noted above, cellular networks include a number of network components. For example, cellular networks often include a radio access network (RAN), an edge network, and a core network. In many instances, the RAN may include base stations having components thereon that communicate wirelessly with user devices (e.g., mobile devices or other endpoints) and facilitate interaction with other components of a core network and/or cloud computing system. In addition, the core network may include a variety of functions (e.g., network functions) and nodes that provide services to clients.

In recent years, cellular networks have provided a variety of network functions that enhance capabilities of services and devices on a cellular network. For example, many core networks provide access to a variety of network functions having a wide variety of configurations that control how the network function operates within a respective computing environment. In addition, network functions may have different applicable configurations based on where a network function is implemented geographically, the specific hardware on which the network function is deployed, preferences of individual customers with respect to specific deployments, as well as other factors. This increased complexity and scale is often limited by conventional deployment methods, both in scalability and accuracy.

In addition, as cellular networks continue to grow in size and complexity, tracking and managing changes in deployments of individual or groups of network functions has additionally become more complex and difficult to manage at a large scale. Indeed, where conventional systems often require each network function to be individually configured by a customer, performing large-scale deployments and managing changes in these large-scale deployments can be burdensome, time-consuming, and prone to inaccuracies and inefficiencies.

These and other problems exist in connection with managing deployments of network function resources across a telecommunications network.

DETAILED DESCRIPTION

Figure 1:
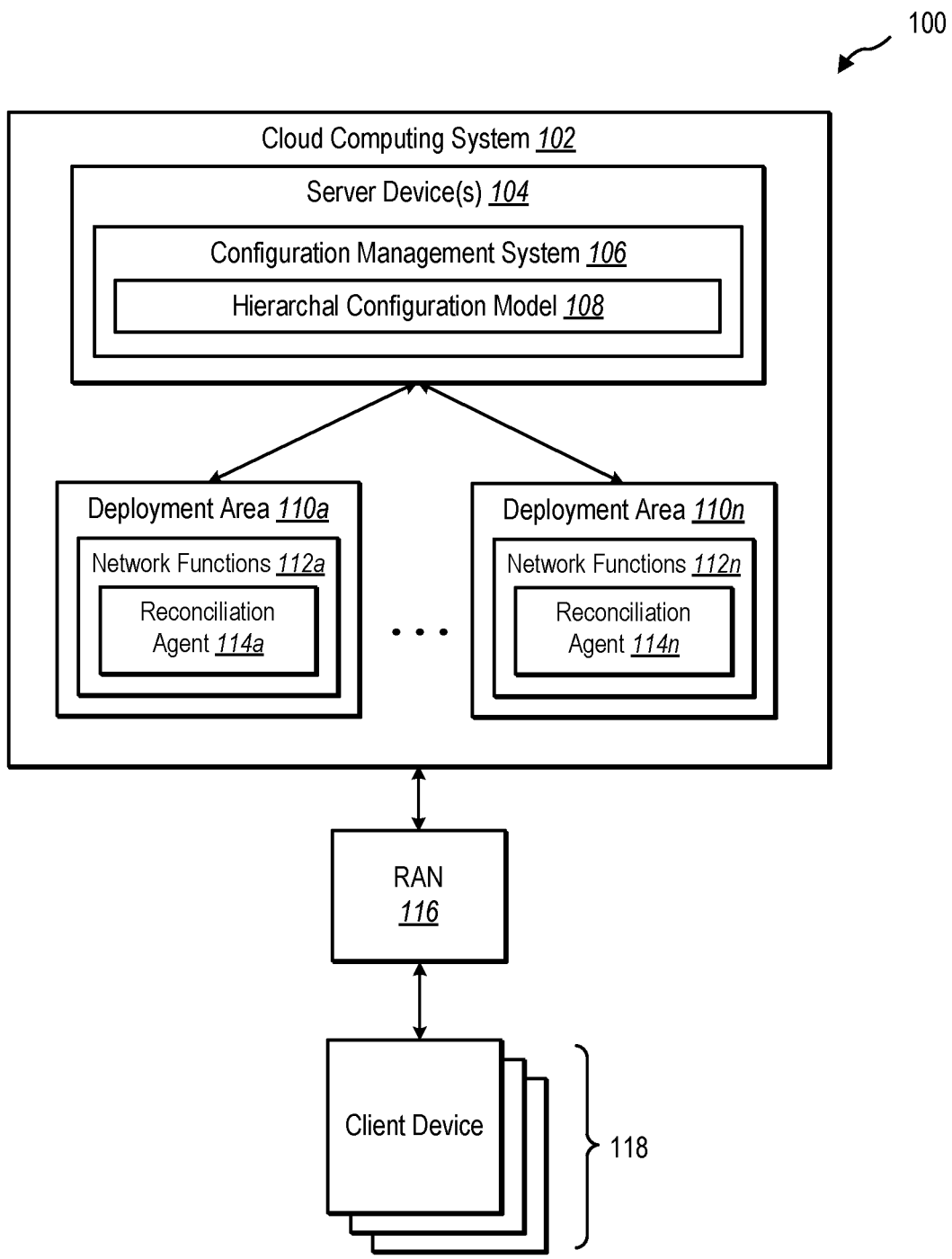
FIG. 1 illustrates an example environment including an implementation of a configuration management system and reconciliation agents for managing deployment of network functions and reconciling configuration states on a cloud computing system.

The present disclosure relates to systems, methods, and computer readable media for managing and maintaining deployments of configurations on network functions in a telecommunications network. In particular, as will be discussed in further detail below, the present disclosure provides examples and implementations of a configuration management system and reconciliation agents that cooperatively perform multi-tiered reconciliation of configuration states for deployments of network functions. As will be discussed herein, features and functionalities involve deployment of network function configurations in accordance with a hierarchical configuration model. In addition, features and functionalities described herein involve performing multiple levels of reconciliation checks on a plurality of network functions to ensure that configurations of the network functions are effectively maintained and consistent with a desired state (e.g., a goal state) of the deployment(s) of network functions.

As an illustrative example, systems described herein (e.g., a configuration management system and reconciliation agent(s)) may cause deployment instructions to be delivered to a network function on a telecommunications network. The deployment instructions may be obtained from a hierarchical configuration model and include configuration management instructions associated with a goal state of the network function. The systems described herein may perform a multi-tiered reconciliation of the network function(s) to ensure that the configuration management instructions are consistent over time with the goal state and do not experience drift from the desired goal state. In one or more embodiments described herein, a first level reconciliation check is performed by confirming that the configuration management instructions were received at the network function(s). The first level reconciliation check may also include determining that the goal state remains unmodified and uncorrupted. In one or more embodiments, a second level reconciliation check is performed by determining a current state of the deployment and verifying whether the current state correspond to (e.g., matches) the goal state. In one or more embodiments, the reconciliation checks are performed asynchronously.

The present disclosure includes a number of practical applications that provide benefits and/or solve problems associated with managing deployment of network functions and maintaining consistency and accuracy of the configurations of the network functions over time. Some example benefits are discussed herein in connection with various features and functionalities provided by a configuration management system and/or reconciliation agents. It will be appreciated that benefits discussed herein are provided by way of example and are not intended to be an exhaustive list of all possible benefits.

Features and functionality of the systems described herein provide a mechanism whereby deploying and configuring network functions can be performed automatically (e.g., without user input with respect to deployment and maintenance of each network function). In particular, by utilizing a hierarchical configuration model in accordance with one or more embodiments described herein, a configuration management system can process a request (e.g., a single request) to deploy any number of network functions across one or multiple deployment areas. Indeed, as will be discussed in further detail below, the configuration management system can apply the hierarchical configuration model to a request to filter the request (e.g., restrict the deployment to a subset of deployment areas) and fan out the request (e.g., repeat one or more configuration instructions across multiple instances of network functions) as well as other deployment actions discussed herein.

By utilizing a hierarchical configuration model, the systems described herein may process requests to deploy a wide variety of network functions having a variety of configuration instructions associated therewith. Indeed, where configuring network functions often requires an individual (e.g., a customer) to have knowledge about unique characteristics of a specific network function or network function type, features of the systems described herein enable a user to more generically request deployment of a set of network functions and allow the hierarchical configuration model to apply specific configuration management instructions across multiple instances of network functions based on instructions referenced by individual nodes or branches of nodes from the hierarchical configuration model.

In addition, by utilizing a hierarchical configuration model that has branches that are associated with respective deployment areas, the systems described herein can avoid conventional approaches in which a customer manually configures network functions differently depending on domain knowledge of the different geographic areas. This avoids a time-consuming and error-prone approach to large numbers of network functions deployed across multiple deployment areas.

In addition, as noted above, this allows fanout of network functions across deployment areas in which configurations of the network function instances are modified across the deployment areas in accordance with the configuration management instructions referenced in the different branches of the hierarchical configuration model. This can be expanded to specific types of hardware, different types of network functions that may differ across deployment areas and/or across hardware nodes. This additionally minimizes growth in solution complexity even as scale and scope of deployments increase.

As noted above, rather than requiring a customer to individually configure network functions, the systems described herein provide a mechanism whereby a customer can provide a single request to deploy network functions across multiple deployment areas. In one or more embodiments, this is accomplished by employing a request that includes an application programming interface (API) call which references nodes or branches of a hierarchical configuration model. Indeed, using single API call, an individual may indicate any number of network functions as well as deployment areas of a telecommunications network and any other identifiers that point to specific nodes or branches of the hierarchical configuration model. This unique format allows for the systems described herein to process a request in a way that filters, fans out, and customizes configurations of network function instances on computing resources of a telecommunications network.

In addition, by utilizing the hierarchical configuration model in combination with a multi-tiered reconciliation approach, the systems described herein enable deployments to be implemented based on a declarative request (e.g., a non-imperative declaration of intent) that indicates a goal state for a deployment of network functions on the telecommunications network. For example, rather than a customer generating and submitting an imperative command to each and every network function to implement specific configuration parameters, the systems described herein enable a customer to submit a declarative request (e.g., consistent with the hierarchical configuration model) that indicates a goal state for a deployment. As will be discussed below, this goal state may be used in a multi-tiered reconciliation approach that allows individual agents on the network functions to reconcile configuration states in a way that maintains consistency of network functions deployed on a large scale.

As will be discussed below, the systems described herein implement an asynchronous approach to performing multi-tiered reconciliation. By asynchronously performing the different levels of reconciliation, the systems described herein provide a scalable approach to maintaining consistency of configurations on network functions. For example, rather than a central management system being tasked with coordinating precise scheduling of updates between potentially hundreds or thousands of network functions, the systems described herein enable a first level reconciliation to be performed without coordinating when each of the individual network functions will carry out performance of a second level reconciliation. This allows the individual network functions to reconcile any inconsistencies via a second level reconciliation without having to coordinate reconciliation stages from a centralized system.

Thus, the features and functionalities of the systems described herein provide an efficient and scalable approach that can be included within existing framework of telecommunications networks. Moreover, as telecommunications networks grow in size and complexity, features and functionality of the systems described herein can similarly scale without requiring a more robust coordination framework to ensure that the network functions and associated configurations are accurately maintained. Indeed, by deploying reconciliation agents, performing multi-tiered reconciliation, and implementing a hierarchical configuration model for filtering and fanning out deployments, the systems described herein provide a dynamic and scalable approach to automating deployment as well as ensuring accuracy and consistency across a deployment of any number of network functions in a telecommunications network.

As illustrated in the foregoing discussion, the present disclosure utilizes a variety of terms to describe features and advantages of a configuration management system within a variety of computing environments. Additional detail will now be provided regarding the meaning of some of these terms.

As used herein, a "cloud computing system" or "distributed computing system" may be used interchangeable to refer to a network of connected computing devices that provide various services to computing devices (e.g., customer devices). For instance, as mentioned above, a cloud computing system can include a collection of physical server devices (e.g., server nodes) organized in a hierarchical structure including clusters, computing zones, virtual local area networks (VLANs), racks, fault domains, etc. In one or more embodiments described herein a portion of the cellular network (e.g., a core network) may be implemented in whole or in part on a cloud computing system. In one or more embodiments a data network may be implemented on the same or on a different cloud computing network as the portion of the cellular network.

As used herein, a "telecommunications network" may refer to a system of interconnected devices that are distributed over geographical areas and which provide communication and data capabilities to end-user devices (e.g., mobile and non-mobile devices). In one or more embodiments described herein, a telecommunications network refers to a cellular network that includes radio access network (RAN) components, core network components, and network functions implemented on server nodes on the cellular network. In one or more embodiments described herein, the telecommunications network refers specifically to a fifth generation (5G) network environment; however, other implementations may include previous generations (e.g., 2G, 3G, 4G) or future generations (6G and beyond) that make use of network functions implemented on computing devices of the telecommunications network.

As used herein, a "network function" may refer to an entity in a telecommunications network that provides access to one or more services or applications of the telecommunications network. A network function may refer to one of a wide variety of network function types corresponding to different unique or defined functions or services that may be provided via the telecommunications network. As will be discussed in connection with various examples, a network function may refer to a physical function, virtual network function, or any of a variety of types of network functions. Examples of network functions include, but are not limited to, session management functions (SMFs), user plane functions (UPFs), access and mobility management function (AMF), and any other type of function that can be implemented within a telecommunications network. Indeed, in one or more embodiments, a network function may refer to any function or entity in a telecommunications network (e.g., 2G, 3G, 4G, 5G or beyond cellular environment) that provides access to a service and/or application to a client of the telecommunications network.

In one or more embodiments described herein, a network function may have an associated configuration. As used herein, a "network function configuration," or simply "configuration" may refer to any information indicating rules, commands, or policies associated with operation or behavior of a network function within a framework of a telecommunications network. A configuration may include instructions associated with a lifecycle of a network function, such as a type of network function, general behavior of the network function, types of services that a network function is configured to provide, a timeline of a lifetime of the network function, etc. A configuration may additionally include instructions associated with configuration management (CM) policies, such as communication restrictions, security policies, deployment-area specific policies, or other behavior related rules or instructions. Examples of configurations and various configuration policies will be discussed in further detail below.

As used herein, a "deployment area" may refer to an area within a telecommunications network within which a network function is deployed. In one or more embodiments, a deployment area may refer specifically to a geographic area, such as a datacenter, a geographic region, a cluster (or group of clusters) of devices, an edge network, or other physical, logical, or geographic grouping of devices. In one or more embodiments described herein, a deployment area refers to any grouping of devices as defined within a hierarchical configuration model. A deployment area may refer to a small grouping of devices (e.g., a specific server rack) or, alternatively, may refer to a large grouping of devices (e.g., an entire datacenter or set of multiple datacenters).

As used herein, a "request" or "deployment request" may refer to an expression of intent or command to deploy one or more network functions on the telecommunications network. In one or more embodiments, a request refers to an expression of intent to deploy one or more physical and/or virtual network functions at one or across multiple deployment areas. In one or more embodiments, a request refers to an expression of intent to inject or deploy a configuration (or multiple configurations) to instances of network functions that are currently deployed or pre-deployed (e.g., pre-provisioned). Indeed, a request may refer to an expression of intent to initiate a new deployment, modify an existing deployment, or simply modify a configuration of a deployment of network function(s) on the telecommunications network.

Thus, in one or more embodiments, processing a request for deployment of network functions may involve deploying network functions, modifying previously deployed network functions, or injecting configuration policies in pre-deployed network functions, or some combination thereof. Moreover, as will be discussed in connection with one or more embodiments described herein, an act of deploying a network function may refer to an act of setting up or initiating a network function instance, an act of modifying an existing deployment, an act of injecting policies, rules, or other configuration management instructions into an existing or pre-provisioned network function, decommissioning a previously deployed network function or some combination of the above.

In one or more embodiments described herein, the configuration management system facilitates deployment of a request based on characteristics of a hierarchical configuration model. As used herein, a "hierarchical configuration model" refers to a diagram (e.g., a class diagram) including nodes that are organized in a hierarchical manner and having associated configuration instructions associated therewith. As will be discussed in further detail below, a hierarchical configuration model may include a top-level node (e.g., a mobile packet core) having one or more configuration management policies that are globally applicable to network functions on a telecommunications network. The hierarchical configuration model may additionally include nodes and/or branches associated with different deployment areas of the telecommunications network. The hierarchical configuration model may also include configuration management nodes and/or branches that include certain configuration management policies. Examples of nodes and branches of example hierarchical configuration models are discussed in further detail below in connection with various embodiments.

As used herein, a "configuration state" may refer to a current or desired state of a configuration for an associated network function. For example, a "current configuration state" or simply "current state" may refer to a state or snapshot of a configuration of a network function that reflects a current set of configuration instructions that are in effect on a network function. A "goal configuration state" or simply "goal state" may refer to a desired configuration consistent with a current set of deployment instructions that have been provided for an associated network function. As will be discussed in further detail below, a current configuration and a goal configuration may match one another, in which case a network function is likely configured as desired. Alternatively, where a goal state and a current state are not matching, one or more mitigation actions may be necessary to reconcile the current configuration state.

As used herein, a "reconciliation check" or "reconciliation loop" refers to one or more acts related to performing one of multiple levels of reconciliation checks with regard to a goal configuration state and a current configuration state. The reconciliation checks may involve acts related to identifying goal and current configuration states and reconciling information contained within the respective configuration states. As will be discussed below, the reconciliation checks may refer to different levels of configuration checks that are performed asynchronously in reconciling the different configuration states that are applicable to a given set of one or more network functions.

Additional detail will now be provided regarding implementation of one or more systems (e.g., configuration management system and reconciliation agents) described herein. For example, FIG. 1 illustrates an example environment 100 including a cloud computing system 102 on which a telecommunications network can be implemented. As shown in FIG. 1, the cloud computing system 102 includes one or more server device(s) 104 having a configuration management system 106 implemented thereon. As further shown, the configuration management system 106 may include a hierarchical configuration model 108, which will be discussed in further detail below.

As shown in FIG. 1, the cloud computing system 102 may include a plurality of deployment areas 110a-n having network functions 112a-n implemented (e.g., deployed, configured) thereon. As noted above, the deployment areas 110a-n may refer to geographic areas including groupings of network devices (e.g., server nodes) on the cloud computing system 102. For example, a first deployment area 110a may refer to a first datacenter with additional deployment areas referring to other datacenters. In one or more implementations, the deployment areas 110a-n may be more granular in nature, such as a physical or logical grouping of devices within a single datacenter, or a mix of different sized groupings of devices as may fit a particular embodiment. In one or more embodiments, the deployment areas 110a-n are defined as branches (e.g., deployment area branches) of the hierarchical configuration model 108. The cloud computing system 102 may include any number of deployment areas 110a-n.

The network functions 112a-n may include any number and variety of network functions as may be deployed on respective deployment areas 110a-n. For example, a first set of network functions 112a may include any number and variety of network function types as are configured to be deployed on nodes of the first deployment area 110a. Each of the additional sets of network functions on the additional deployment areas may similarly include any number and variety of network function types.

As shown in FIG. 1, and as will be discussed in further detail below, each of the network functions 112a-n may include reconciliation agents 114a-n. The reconciliation agents 114a-n may cooperatively perform multiple levels of reconciliation checks with the configuration management system 106 to determine whether a current state of a configuration for a deployment of network functions is as it was intended to be deployed on the network functions 112a-n. For example, each of multiple reconciliation agents may determine whether a current configuration state is consistent with or matches a goal configuration state received from the configuration management system 106. This may be done using an asynchronous multi-tiered approach, as will be discussed below in connection with various examples.

As further shown in FIG. 1, the environment 100 may include a radio access network (RAN) 116 and a plurality of client devices 118. It will be appreciated that components 102-118 of the environment 100 may refer to portions of a communication environment (e.g., a cellular network, such as a 5G network). For example, the components 102-118 illustrates in FIG. 1 may form a public or private cellular network, which include a RAN, core network, and data network. In one or more embodiments, components of a core network or RAN 116 may be implemented as part of an edge network, datacenter, or at various locations as may serve a particular implementation of the environment 100.

The client devices 118 may refer to a variety of computing devices or device endpoints including, by way of example, a mobile device such as a mobile telephone, a smartphone, a personal digital assistant (PDA), a tablet, or a laptop. Alternatively, one or more of the client devices 118 may refer to non-mobile devices such as a desktop computer, a server device (e.g., an edge network server), or other non-portable devices. In one or more embodiments, the client devices 118 refer more generally to any endpoint capable of communicating with devices on a cloud computing system 102, such as Internet of Things (IoT) devices, or other Internet-enabled devices. In one or more embodiments, the client devices 118 refer to applications or software constructs on corresponding computing devices.

The RAN 116 may include a plurality of RAN sites. In one or more embodiments, each RAN site may include one or more base stations and associated RAN components. While the RAN 116 may include components that are entirely separate from a core network, one or more embodiments of the environment 100 may include one or more RAN components or services traditionally offered by a RAN site that are implemented on the cloud computing system 102 (e.g., as part of a core network). For example, while FIG. 1 illustrates the RAN 116 being entirely separate from the infrastructure of the cloud computing system 102, it will be appreciated that network functions 112a-n may provide services (e.g., physical and/or virtualized functions) that collectively make up a core network, RAN 116, or other portion(s) of a telecommunications network.

As noted above, the configuration management system 106 may have a hierarchical configuration model 108 implemented thereon. As will be discussed in further detail below, the configuration management system 106 may create, modify, update as well as implement a hierarchical configuration model 108 to aid in deploying network functions across one or multiple deployment areas 110a-n. For example, the configuration management system 106 may receive and process a request having a format (e.g., an API call) that complies with the hierarchical configuration model 108.

In particular, the configuration management system 106 may process the request by applying the hierarchical configuration model 108 to the request to perform a combination of filtering the request, fanning out the request, and other acts related to deploying any number of network functions referenced by the request across one or multiple deployment areas 110a-n of the cloud computing system 102. This process of deploying network functions in accordance with the request can be done automatically without receiving additional user input beyond the initial request.

In addition to applying the hierarchical configuration model 108 in deploying instances of network functions, the hierarchical configuration model 108 may be used in generating or otherwise determining and reconciling configuration states for network functions 112a-n deployed across the various deployment areas 110a-n. For example, the configuration management system 106 and reconciliation agents 114a-n may cooperatively perform a first level reconciliation check for the network functions 112a-n by confirming that a goal state has been delivered to and received by the network functions 112a-n. The configuration management system 106 and reconciliation agents 114a-n may asynchronously perform a second level reconciliation check that involves determining a current configuration state and determining whether the current configuration state matches or otherwise corresponds to the previously received goal configuration state.

Figure 2:
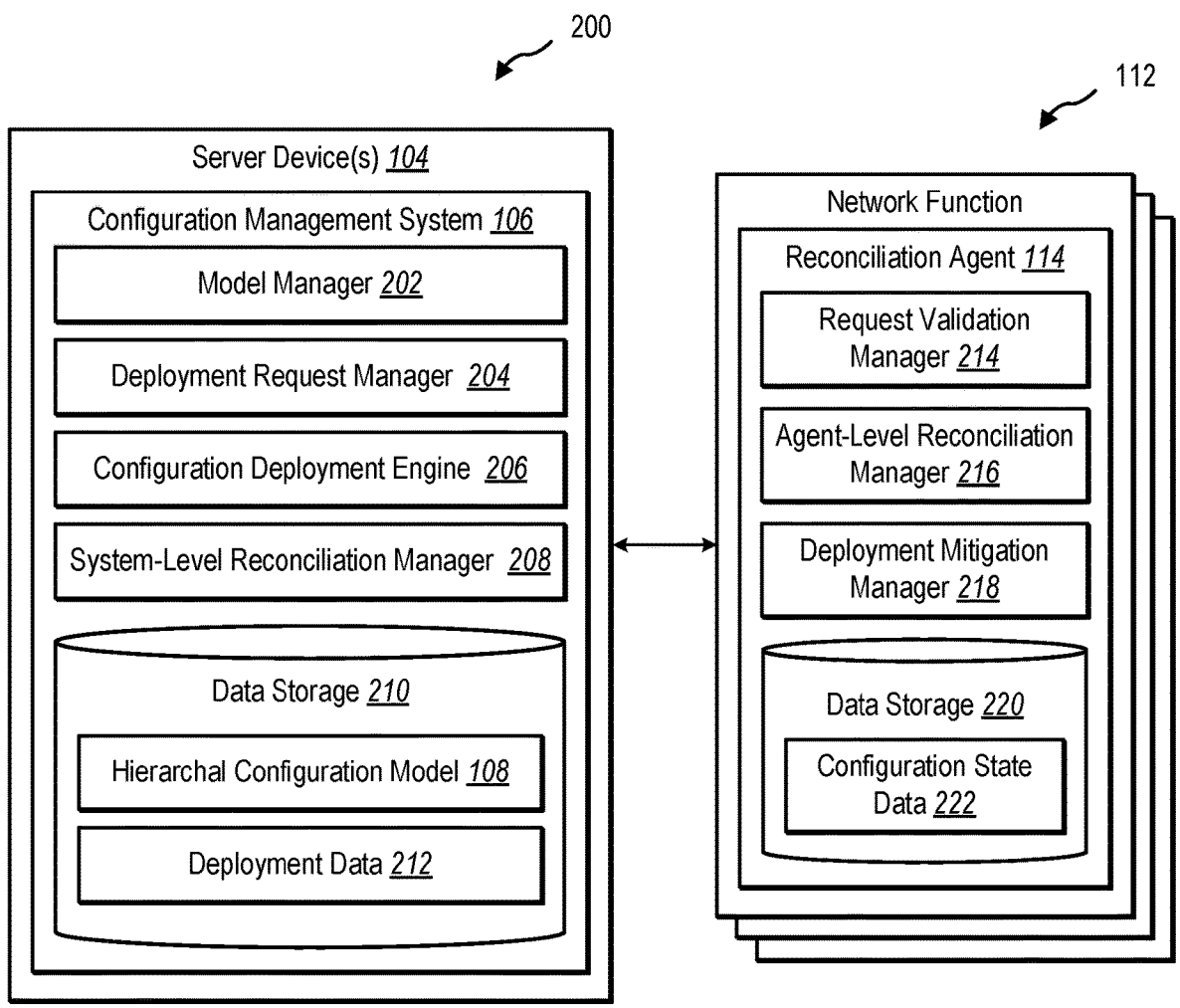
FIG. 2 illustrates an example implementation of a configuration management system and reconciliation agent of a network function in accordance with one or more embodiments.

Additional information in connection with implementing the configuration management system 106 and reconciliation agents 114 will be discussed in further detail in connection with FIG. 2. In particular, FIG. 2 illustrates a computing environment 200 including an example server device(s) 104 and a plurality of network functions 112. As further shown, the server device(s) 104 includes a configuration management system 106 while the network functions include a reconciliation agent 114. Each of these components may refer to similarly named components and share similar features and functionalities as discussed above in connection with FIG. 1.

As will be discussed below, the configuration management system 106 and reconciliation agent 114 may utilize a hierarchical configuration model 108 stored or otherwise maintained on the server device(s) 104 to intelligently deploy network functions in accordance with a received deployment request. Indeed, as will be discussed below, upon receiving a request to deploy network functions across one or more deployment areas of the cloud computing system 102, the configuration management system 106 may filter, fanout, map, and parameterize configuration management instructions across any number of network functions 112.

In addition, the configuration management system 106 and reconciliation agent 114 may cooperatively ensure consistency of the deployed configuration instructions by performing a multi-tiered reconciliation of the network function configurations. For example, as will be discussed in further detail below, the configuration management system 106 may perform a first level reconciliation check (e.g., a first reconciliation loop) by confirming delivery of a goal state to the reconciliation agent 114 based on configuration management instructions obtained from the hierarchical configuration model 108. The reconciliation agent 114 may then perform a second level reconciliation check (e.g., a second reconciliation loop) by comparing a current configuration state to the goal state to determine whether any changes to the deployment have occurred on one or more of the network functions 112.

Additional information will be discussed in connection with example components that may be included within the configuration management system 106 and reconciliation agent 114. Each of the components of the respective systems (e.g., the configuration management system 106 and/or reconciliation agent 114) may provide features and functionality of one or more implementations described herein. While certain components are described in connection with software or hardware modules implemented on a single device or on a respective network function, it will be appreciated that one or more of the components of the respective systems may be implemented on the same or across multiple devices and/or network functions. In addition, while various features are described in connection with individual components of the respective systems, it will be appreciated that features described in connection with different components may be implemented by a single component or may be implemented across multiple components discussed herein.

As shown in FIG. 2, the configuration management system 106 may include a number of components for carrying out a deployment of network functions as well as reconciling configuration states on the network functions. For example, as shown in FIG. 2, the configuration management system 106 includes a model manager 202, a deployment request manager 204, a configuration deployment engine 206, and a system-level reconciliation manager 208. As further shown, the configuration management system 106 includes a data storage 210 having the hierarchical configuration model 108 and deployment data 212 maintained thereon.

As just mentioned, the configuration management system 106 includes a model manager 202. The model manager 202 may perform features related to creating, updating, or otherwise managing the hierarchical configuration model 108. In one or more embodiments, the hierarchical configuration model 108 is managed by an administrator of the cloud computing system 102 or other individual having access to the hierarchical configuration model 108 and who has domain knowledge of the cloud computing infrastructure. For example, the hierarchical configuration model 108 may be managed by an individual or team that has knowledge or awareness of similarities and differences across different deployment areas of the cloud computing system 102.

In one or more embodiments, the model manager 202 may facilitate addition, removal, and/or modification of nodes or branches of the hierarchical configuration model 108. For example, the model manager 202 may add new nodes to the hierarchical configuration model 108 based on additional deployment areas being added to the cloud computing system 102 or based on specific groupings of devices within the cloud computing system 102 being defined as a deployment area. As additional network functions are added to the cloud computing system 102 (or to specific deployment areas), additional nodes may be added to the hierarchical configuration model 108 to reflect the additional network functions.

In addition to adding deployment areas and network function types, the model manager 202 may facilitate addition of or modification of configuration management branches of the hierarchical configuration model 108. For example, as network function profiles are updated, or as security features are improved over time, modifications to one or more nodes of the hierarchical configuration model

108 may be updated to reflect the changes to the various policies or features. As will be discussed below, this enables a quick and efficient rollout of updates to configurations across network functions deployed across multiple deployment areas.

As mentioned above, the configuration management system 106 includes a deployment request manager 204. The deployment request manager 204 may manage receipt and processing of deployment requests received by customers of the cloud computing system 102. As noted above, a deployment request (or simply "request") may refer to an API call having a format that is compatible with a format of the hierarchical configuration model 108. For example, the API call may include text having fields that reference specific nodes and/or branches of the hierarchical configuration model 108.

In one or more embodiments, the deployment request manager 204 receives a request and verifies that the request is valid and can be processed based on the hierarchical configuration model 108. For example, the deployment request manager 204 may receive a request and verify that it follows a particular format that complies with a structure of the hierarchical configuration model 108. In addition, the deployment request manager 204 may verify that the instructions included within the request do not violate any specific or predetermined deployment policies that may be carried out by the configuration management system 106.

In one or more embodiments, the deployment request manager 204 provides an interface that enables a customer to compose a deployment request. For example, in one or more embodiments, the deployment request manager 204 provides an interface including any number of features of network functions (e.g., network function types, network function characteristics), deployment areas, and/or configuration management instructions that may be included within a request. Indeed, the deployment request manager 204 may provide an interface via a client device to enable a customer to generally indicate details of a deployment (e.g., number of network functions, deployment areas of the network functions, etc.)

In one or more embodiments, the options provided by the deployment request manager 204 are limited to the nodes that exist within the hierarchical configuration model 108. For example, the deployment request manager 204 may provide a finite number of configuration options via an interface and compose a request based on the selected configuration options. Alternatively, where a customer composes a request via a text-based input, the deployment request manager 204 may simply verify that the request has a format that complies with the hierarchical configuration model 108.

As mentioned above, and as shown in FIG. 2, the configuration management system 106 includes a configuration deployment engine 206. The configuration deployment engine 206 can perform any features and functionality related to processing a received (and validated) request based on application of the hierarchical configuration model 108 to the request. In particular, as mentioned above, and which will be discussed by way of examples herein, the configuration management system 106 may apply a hierarchical configuration model 108 to a request to process the request and generate deployment instructions.

As used herein, applying the hierarchical configuration model 108 to a request is inclusive of any act related to deploying one or more network functions based on information contained within the hierarchical configuration model 108. For example, in one or more embodiments, the configuration deployment engine 206 processes a request by filtering the request (e.g., determining a subset of deployment areas on which to deploy network functions), fanning out the request (e.g., iterating configuration management instructions across any number of network function instances), mapping the request (e.g., determining specific configuration instructions that are applicable to a given network function type and/or deployment area), and/or parameterizing the request (e.g., performing acts related to individualizing a deployment, such as assigning a specific internet protocol (IP) address or other configuration parameter(s)).

In addition, as noted above, deploying a request may refer to acts of deploying, decommissioning, or simply modifying a deployment or pre-deployment of network functions on the cloud computing system 102. For example, a request may include a request to start up and configure new instances of network functions. In one or more embodiments, a request may include a request to inject a configuration to one or more network functions that are previously deployed or pre-provisioned on server nodes of a particular deployment area. In one or more embodiments, the request includes instructions having a combination of instructions associated with deploying new network functions, modifying existing or previously deployed network functions, or decommissioning network functions.

As mentioned above, and as further shown in FIG. 2, the configuration management system 106 includes a system-level reconciliation manager 208. The system-level reconciliation manager 208 may provide features and functionality related to ensuring consistency or otherwise maintaining a configuration state as indicated in a deployment request and having consistency with the hierarchical configuration model 108. In one or more embodiments, the system-level reconciliation manager 208 may determine or generate a goal configuration state associated with a desired configuration to be deployed on the one or more network functions 112. The goal configuration state may refer to a desired configuration state to be deployed on a particular network function. Alternatively, the goal configuration state may refer to a desired configuration state for a deployment that is descriptive of a deployment across a plurality of network functions. In either example, the system-level reconciliation manager 208 may generate or otherwise determine a goal state applicable to any specific network function associated with a deployment.

As noted above, the goal state of a network function may refer to a particular configuration of the network function based on information contained within the hierarchical configuration model 108. In one or more embodiments, the goal state is determined for the network function based on the deployment request and simply maintained by the system-level reconciliation manager 208 until the hierarchical configuration model 108 is changed or until a new request modifying the deployment is changed.

As will be discussed below, the system-level reconciliation manager 208 may perform (e.g., cooperatively perform with the reconciliation agent 114) a first level reconciliation check on one or more network functions. In one or more embodiments, the system-level reconciliation manager 208 performs the first level reconciliation check by confirming with the network function(s) that a goal configuration state has been delivered and received by the network function(s).

The system-level reconciliation manager 208 may perform the first level reconciliation check any number of times over various periods of time. For example, the system-level reconciliation manager 208 may perform the first level reconciliation check by periodically providing the goal configuration state to each of the network functions 112 at fixed or variable intervals. In one or more embodiments, deploying the configuration management instructions is a first instance of performing the first-level reconciliation check by providing the goal state to the network functions. In addition, the system-level reconciliation manager 208 may provide the goal configuration state to the network functions any number of times subsequent to initially deploying the network functions. As will be discussed below, the system-level reconciliation manager 208 may perform the first level reconciliation check asynchronously from the reconciliation agent 114 performing a second level reconciliation check.

While the configuration management system 106 may issue imperative commands mandating performance of specific actions or tasks by the network functions 112, the act of providing the goal configuration state may refer specifically to providing a non-imperative or declarative set of instructions. Indeed, in one or more embodiments, the system-level reconciliation manager 208 may generate the goal state and provide goal state information to the network functions without commanding or specifically causing the network functions to perform specific configuration actions, such as performing a second level reconciliation check. Rather, the system-level reconciliation manager 208 may provide the goal state information and allow the network functions to utilize the goal state information at a subsequent time on a schedule that the network functions 112 may determine to minimize interruption of services and/or decrease coordination on the part of the configuration management system 106.

As shown in FIG. 2, the configuration management system 106 includes a data storage 210 having data maintained thereon. As shown in FIG. 2, the data storage 210 includes the hierarchical configuration model 108 thereon. Any of the components 202-208 may access the hierarchical configuration model 108. In one or more embodiments, components 214-218 of the reconciliation agent 114 may obtain access to information contained within the hierarchical configuration model 108.

As further shown, the data storage 210 may include deployment data 212. The deployment data 212 may include any information associated with deployment instructions and configuration management instructions that have been generated and/or communicated to the network functions 112. For example, the deployment data 212 may include any data associated with a goal state of one or more network function deployments. This goal state data may differ or be similar to information included within the hierarchical configuration model 108.

Additional information will now be discussed in connection with components of the reconciliation agent 114 on a given network function. The reconciliation agent 114 may refer to any reconciliation agent 114 on any of the network functions 112. For example, the reconciliation agent 114 may refer to one of the reconciliation agents 114*a-n* discussed above in connection with the environment 100 shown in FIG. 1. Thus, any features described herein with respect to the example reconciliation agent 114 shown in FIG. 2 may similarly apply to any reconciliation agent implemented on any of the network functions 112, including network functions of different network function types.

As shown in FIG. 2, the reconciliation agent 114 may include a request validation manager 214. The request validation manager 214 may perform a number of acts related to validating a deployment request for a given network function. For example, upon receiving deployment instructions pursuant to a deployment request, the reconciliation agent 114 may verify that the deployment instructions constitute a valid deployment request. Validating the instructions may include determining that the request is properly formatted and interpretable by the reconciliation agent 114 in rolling out the deployment on the network function.

In addition to generally determining that the deployment instructions constitute a valid deployment request, the reconciliation agent 114 may perform one or more internal validation checks. For example, the reconciliation agent 114 may cross-check any of the configuration management instructions to ensure that one or more local or internal rules of the network function are not violated. As an example, the reconciliation agent 114 may determine that the deployment instructions to not conflict with previously received instructions from the configuration management system 106 and/or with instructions that have been provided with one or more additional network functions within a communication environment of the relevant network function. As another example, the reconciliation agent 114 may determine that a number of instances or servers requested is available. Indeed, the reconciliation agent 114 may perform any verification to ensure that a deployment will not fail when reconciliation agents on the network functions attempt to roll out the deployment request(s).

As further shown in FIG. 2, the reconciliation agent 114 includes an agent-level reconciliation manager 216. The agent-level reconciliation manager 216 may cooperatively perform the multi-level reconciliation checks with the configuration management system 106. Indeed, as discussed above, the agent-level reconciliation manager 216 may perform a first level reconciliation check and a second level reconciliation check for a deployment to ensure consistency and reliability of a deployment that has previously been verified and rolled out on the network functions 112.

The agent-level reconciliation manager 216 may perform the first level reconciliation check by verifying that a goal configuration state has been successfully delivered by the configuration management system 106. In one or more embodiments, the goal configuration state is periodically provided (e.g., at predetermined time intervals) to the reconciliation agent 114 by the configuration management system 106. In one or more embodiments, the agent-level reconciliation manager 216 periodically requests, accesses, or otherwise obtains the goal configuration state as part of the first-level reconciliation check. In any of the examples, the agent-level reconciliation manager 216 obtains the goal configuration state including a declaration of the desired state of the deployment on the network function.

In an asynchronous process from performing the first-level reconciliation check (e.g., a first-level reconciliation loop), the agent-level reconciliation manager 216 may perform a second-level reconciliation check (e.g., a second-level reconciliation loop) in accordance with one or more examples described herein. In one or more embodiments, performing the second-level reconciliation check involves identifying or otherwise identifying a current configuration state of the deployment of the network function. For example, the agent-level reconciliation manager 216 may access the configuration state data 108 to determine a current state of the network function configuration.

In addition to determining the current configuration state, the agent-level reconciliation manager 216 may perform the second-level reconciliation check by determining that the current configuration state matches the previously received goal configuration state. In one or more embodiments, the agent-level reconciliation manager 216 compares the determined current configuration state by comparing the current configuration against a most recently delivered goal configuration state received when the latest first-level reconciliation check was last performed by the agent-level reconciliation manager 216 and configuration management system 106. In one or more embodiments, the agent-level reconciliation manager 216 determines whether the current configuration state (e.g., a most recently determined current state) matches the most recently received goal configuration state.

As mentioned above, and as will be discussed in further detail below in connection with FIGS. 6A-7, the agent-level reconciliation manager 216 may perform the first and second level reconciliation checks independently from one another. In particular, the agent-level reconciliation manager 216 may perform the different level (e.g., multi-level) reconciliation checks asynchronously. To illustrate, in one or more embodiments, the goal configuration state may be provided without any consideration of a timing or current state of the configuration. For example, as noted above, the configuration management system 106 may provide the goal configuration state at periodic and/or regular intervals to inform the network function 112 of a declarative state indicating a desired state of the network function deployment(s). In one or more embodiments, the configuration management system 106 delivers instances of the goal configuration state one or multiple times without the agent-level reconciliation manager 216 performing a second level reconciliation check.

Similarly, the agent-level reconciliation manager 216 may perform the second level reconciliation check asynchronously from performing (e.g., cooperatively performing with the configuration management system 106) the first level reconciliation check. To illustrate, the agent-level reconciliation manager 216 may identify or determine a current check at regular intervals or based on any locally determined trigger condition independent from when the latest goal configuration state has been provided to the network function 112. Indeed, because the goal configuration state is a declarative state simply indicating a desired state of a configuration on the network function 112, the agent-level reconciliation manager 216 may perform any imperative commands to implement the configuration instructions on a schedule that is optimal for the network function 112, such as at a locally scheduled time that does not interrupt normal operation of the network function 112 (or other network functions being implemented on a shared set of computing resources).

As noted above, the first level reconciliation check involves providing a goal state including one or more declarative statement indicating a goal state of the deployment. State differently, the goal state may indicate a desired state, but without providing one or more imperative commands to be executed by the reconciliation agent 114. In this manner, the agent-level reconciliation manager 216 may perform the second level reconciliation check asynchronously from the first level reconciliation check and locally cause any imperative actions to be generated and executed as part of a process to reconcile the current and goal configuration states.

While one or more embodiments described herein specifically describe an environment in which multi-tiered reconciliation is performed using first and second level reconciliation loops, it will be understood that additional implementations may involve additional levels of reconciliation loops. As an example, a system-level reconciliation system may coordinate with a datacenter-level reconciliation system, which may coordinate with lower-level reconciliation managers or agents based on features and functionality described in connection with example implementations described herein. Each of the reconciliation loops may include verifying communication of configuration states and/or determining whether a configuration state of one or multiple network functions matches a previously received goal configuration state. Thus, while one or more embodiments described herein relate specifically to a multi-tiered reconciliation process that involves a first-level reconciliation check and a second-level reconciliation check, examples described herein are not necessarily limited to a two-tiered reconciliation system. Indeed, one or more embodiments may incorporate two or more levels of reconciliation loops as may serve a particular implementation of the configuration management system 106 and/or reconciliation agents 114.

As further shown in FIG. 2, the reconciliation agent 114 includes a deployment mitigation manager 218. The deployment mitigation manager 218 may perform a variety of mitigation acts to cause a configuration of the network function 112 to match or otherwise reconcile with a goal configuration state received by the configuration management system 106. For example, where a network function having a particular configuration is supposed to be running, the deployment mitigation manager 218 may perform a series of acts to cause the network function having the particular configuration to start running (e.g., in accordance with the goal configuration state). This may be done by issuing an imperative command (or multiple commands) by the deployment mitigation manager 218 to reconcile the current configuration state with the goal configuration state. Alternatively, where the goal state and current state are matching, the deployment mitigation manager 218 may simply perform no additional actions and allow the network function to continue running until it is determined that the current state and goal state are mismatched.

In one or more embodiments, performing the mitigation actions involves determining whether there is a mitigation action to be performed. For example, where the deployment mitigation manager 218 determines that a goal state has not been successfully delivered (or that the goal state has been modified or corrupted), the deployment mitigation manager 218 may determine that the goal state should be resent. As another example, where the deployment mitigation manager 218 determines that the goal configuration state and the current configuration state do not match, the deployment mitigation manager 218 may determine if a mitigation action corresponds to the type of mismatch or whether there is a set of commands that may be issued to cause the current state of the network function to reconcile with the goal configuration state. In the event that a known mitigation action exists, the deployment mitigation manager 218 may perform the mitigation action that causes the current configuration state to match the goal configuration state.

In one or more embodiments, the deployment mitigation manager 218 may maintain a log of mitigation actions performed for future reference. For example, upon performing a first mitigation action, the deployment mitigation manager 218 may add a record of the first mitigation action to a record of mitigation actions. In one or more embodiments, the deployment mitigation manager 218 may consider a number of previously performed mitigation actions to determine whether additional mitigation needs to be performed or whether something is fundamentally wrong with the network function 112 that merits additional attention.

For example, upon determining a mismatch between configuration states, the deployment mitigation manager 218 may elect to not locally perform a particular mitigation action where a threshold number of mitigation actions have recently been performed. Rather, the deployment mitigation manager 218 may escalate the mitigation to the configuration management system 106 or other entity on the cloud computing system 102 to determine whether other mitigation actions should be performed. In one or more embodiments, the mitigation action may involve causing the network function to migrate to another server node so that the server node may be serviced to diagnose why the configuration state is drifting and/or whether the server node needs to be replaced or serviced.

As further shown in FIG. 2, the reconciliation agent 114 includes a data storage 220. As shown in FIG. 2, the data storage 220 includes configuration state data 222. The configuration state data 222 may include any information associated with configuration states received or determined for the network function 112. For example, the configuration state data 222 may include any information associated with a current state of information relied on to determine a current configuration state. In one or more embodiments, the configuration state data 222 includes any information about a goal state of the network function 112 previously received from the configuration management system 106. In one or more embodiments, the configuration state data 222 only includes information about the latest identified current configuration state and a latest received goal configuration state obtained while performing most recent iterations of the first-level reconciliation check and the second-level reconciliation check.

Figure 3:
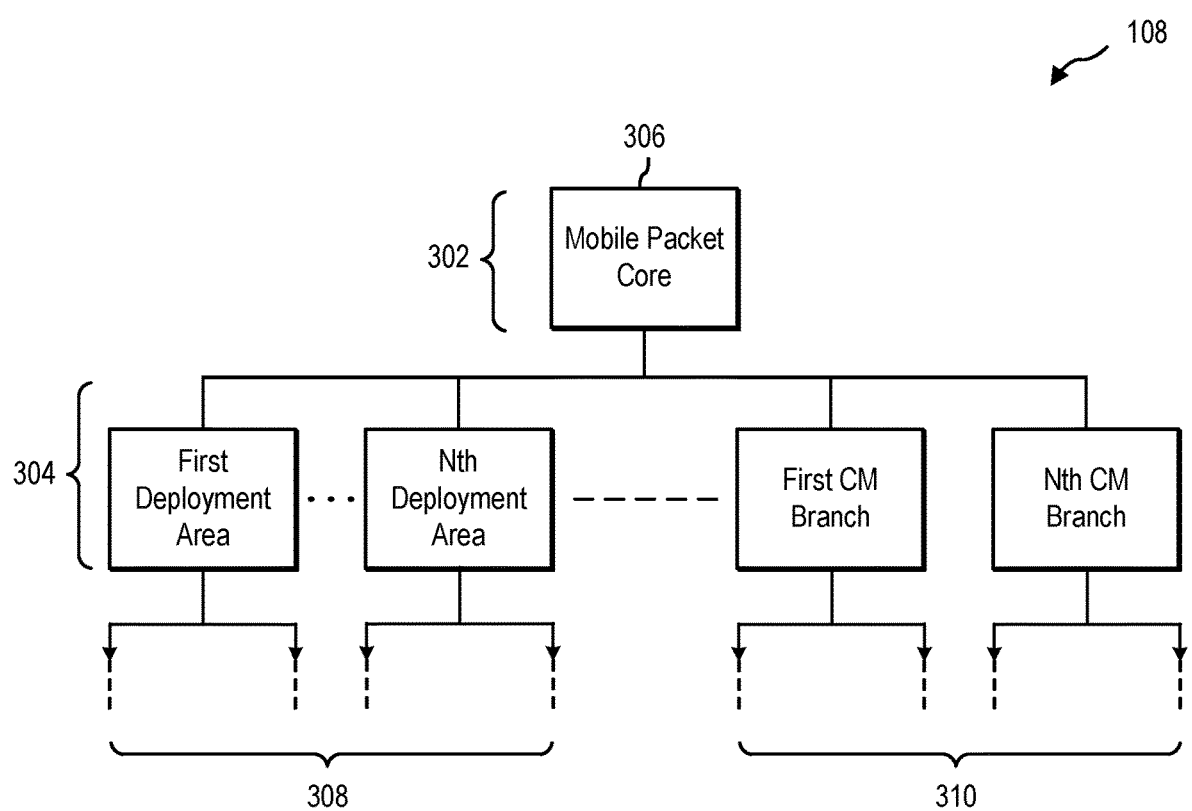
FIG. 3 illustrates an example implementation of a hierarchical configuration model in accordance with one or more embodiments.

Additional information will now be discussed in connection with example implementations of the hierarchical configuration model 108 with respect to deploying network functions on a telecommunications network. For example, FIG. 3 illustrates an example hierarchical configuration model 108 including multiple levels of nodes that may be applied to a deployment request received by the configuration management system 106. The hierarchical configuration model 108 may include similar features and functionality discussed above in connection with other examples and application of the hierarchical configuration model 108.

As shown in FIG. 3, the hierarchical configuration model 108 includes first level nodes 302 and second level nodes 304. As further shown, the hierarchical configuration model 108 may include additional lower levels. Example features of the additional lower levels will be discussed in connection with example implementations of the hierarchical configuration model 108 shown in FIGS. 4-5.

As shown in FIG. 3, the first level nodes 302 include a top node 306. In one or more embodiments described herein, the top node 306 is referred to as a mobile packet core. In this example, the top node 306 is a base node that serves as a parent node for all branches and lower-level nodes of the hierarchical configuration model 108. Thus, each of the nodes that fall below the top node 306 (e.g., every node of the hierarchical configuration model 108) includes any configuration instructions of the top node 306 applicable thereto. Indeed, the top node 306 includes configuration instructions that are globally applicable to each of the multiple types of network functions as well as all of the possible deployment areas included within the cloud computing system 102 and that are referenced by the hierarchical configuration model 108.

Because the top node 306 is linked to each of the nodes within the hierarchical configuration model 108, any modification of the top node 306 will be applied to each node of the hierarchical configuration model 108. As a result, any modification of any policy or any addition (or removal) of a configuration instruction applied to the top node 306 will be applied or otherwise implemented on each network function across the cloud computing system 102.

As shown in FIG. 3, the hierarchical configuration model 108 may include a plurality of second level nodes 304. As noted above, the second level nodes 304 are children of the top node 306. Each of these second level nodes 304 may be referred to herein as branches of the mobile packet core (or branches of the top node 306).

As shown in FIG. 3, the second level nodes 304 may include different types of branches. By way of example and not limitation, the second level nodes 304 may include a set of deployment area branches 308. The deployment area branches 308 may include sets of nodes having configuration management instructions that are specifically applicable to defined areas (e.g., geographic areas) of the cloud computing system 102.

By way of example and not limitation, the deployment area branches 308 may include any number of deployment area nodes. Each of the deployment area nodes may include configuration management instructions that are applicable to any network function instance that is deployed within the respective deployment area. For example, a first deployment area node may be associated with a first datacenter (or other grouping of server nodes) and include a set of configuration management instructions that are applicable to any network function deployed on the first datacenter. In this example, the configuration management instructions of the first deployment area node may be implemented in addition to the globally applicable configuration management instructions indicated by the top node 306 (e.g., the mobile packet core).

In one or more embodiments, the deployment area branches 308 may include instructions that relate primarily to lifecycle configuration management of the respective network functions. For example, while not strictly limited to lifecycle management instructions, the deployment area branches 308 may include configuration instructions related to setting up network function instances of indicated network function types and setting up the network function instances to receive injection of additional configuration data (e.g., configuration management (CM) instructions) that include policies and rules that restrict or otherwise govern how the different network functions communicate and operate within the respective computing environments.

Each of the additional deployment area nodes may include similar or different sets of configuration management instructions that are applicable to network functions deployed on the respective deployment areas. Additional information in connection with an example deployment area branch of the hierarchical configuration model 108 will be discussed below in connection with FIG. 4.

Also shown in FIG. 3, and provided by way of example, the second level nodes 304 may include a set of configuration management branches 310. The configuration management branches 310 may include a set of nodes having configuration management instructions that are applicable to specific service areas, specific types of network functions, or other groupings of configuration instructions included within the respective branches of the hierarchical configuration model 108.

By way of example, the configuration management branches 310 may include any number of configuration management nodes. For example, a first configuration management node may be applicable to a specific grouping of configuration management instructions. Other deployment management nodes may be applicable to other groupings of configuration management instructions. Additional detail in connection with example configuration management branches will be discussed below in connection with FIG. 5.

In contrast to the deployment area branches 308, the configuration management branches 310 may not necessarily be associated with a specific deployment area. Rather, specific nodes of the configuration management branches 310 may include indicators that point to specific deployment areas of the cloud computing system 102 referenced within the hierarchical configuration model 108.

For example, the first configuration management node may include a reference to a first deployment area node. As a result, when applying the hierarchical configuration model 108 to a received deployment request that references the first configuration management node (or any nodes that are children of the first configuration management node), the indicated configuration management instructions may be applied to network function instances on the first deployment area. As will be discussed in further detail herein, the configuration management node(s) may include references or pointers to multiple deployment areas simultaneously, thus eliminating repetition of specifying configuration(s) intended to be the same across multiple deployment areas. In addition, any configuration management instructions included within the deployment area node(s) will similarly be applied to network function instances deployed in response to the received deployment request (e.g., on the deployment area(s) referenced by the configuration management node(s)).

It will be noted that while many examples described herein relate specifically to an example hierarchical configuration model 108 that is applied to any and all deployment requests, in one or more implementations, the configuration management system 106 may make use of different hierarchical configuration models to process particularly unique deployment requests. For example, a first hierarchical configuration model may be used in processing requests from a first set of customers while a second hierarchical configuration model may be used in processing requests from a second set of customers. For instance, a first set of customers may refer to a vast majority of users of the cloud computing system 102 while a second set of customers may refer to a governmental entity or other entity that requires dedicated computing resources apart from a general group of customers. In this example, a first hierarchical configuration model having a first mobile packet core and associated branches may be applied to requests originating from any of the first set of customers while the second hierarchical configuration model having a second mobile packet core and similar or different associated branches may be applied to requests originating from any of the second set of customers.

Figure 4:
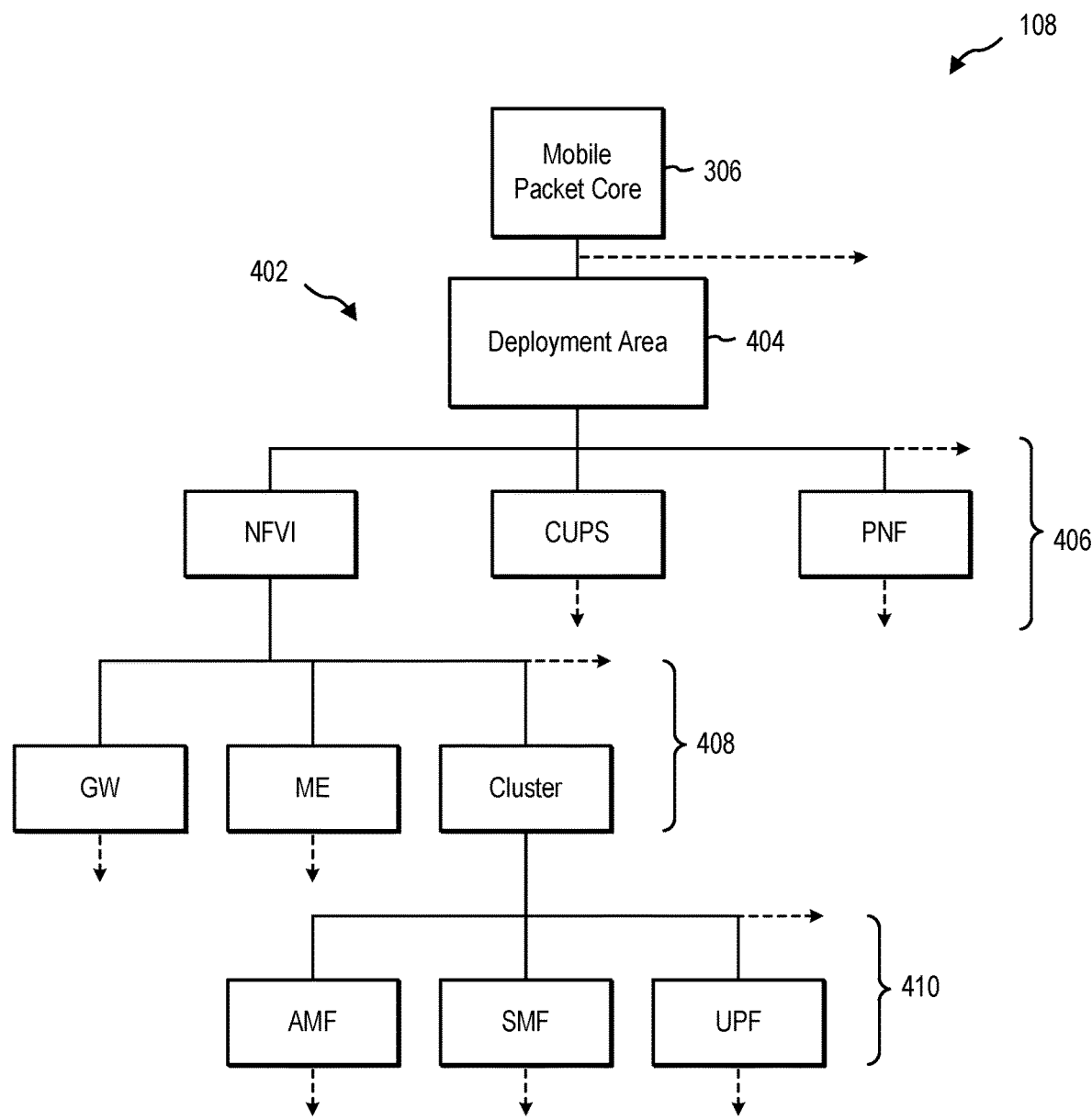
FIG. 4 illustrates example branch of a hierarchical configuration model in accordance with one or more embodiments.

Additional detail will now be discussed in connection with an example deployment area branch of the hierarchical configuration model 108. For example, FIG. 4 illustrates an example deployment area branch 402 of the hierarchical configuration model 108. As shown in FIG. 4, the hierarchical configuration model 108 may include the top node 306 (e.g., a mobile packet core). The hierarchical configuration model 108 may additionally include a deployment area node 404 having any number of lower-level nodes associated therewith. For ease in explanation, FIG. 4 shows a single deployment area branch from a plurality of deployment area branches included within the hierarchical configuration model 108. As such, features and functionalities described in connection with the illustrated deployment area branch 402 may apply to other deployment area branches (as well as configuration management branches).

As shown in FIG. 4, the deployment area node 404 may include a plurality of third level nodes 406. In this example, the third level nodes 406 may include configuration management instructions applicable to different varieties of network functions. For instance, the third level nodes 406 may include a network function virtualization infrastructure (NFVI) node associated with virtualized network functions, a control and user plane separation (CUPS) node, and physical network function (PNF) node. Each of these nodes may include lower levels of nodes associated with different types of network functions that can be categories within the respective third level nodes 406.

As an example in connection with the NFVI category of network functions, the NFVI node may include a set of fourth level nodes 408 including variations on the types of network functions that may be deployed within the category of network functions associated with the NFVI node. For example, the fourth level nodes 408 may include one or more gateway (GW) nodes, one or more management entity (ME) nodes, and a cluster node. Each of these nodes may include configuration management instructions (e.g., lifecycle management and/or configuration management) that are applicable to network functions of the associate type(s) within the category of NFVI functions on the deployment area.

As a further example, the cluster node may include a plurality of fifth level nodes 410 branching therefrom and corresponding to network function types that fall under the cluster (e.g., Kubernetes cluster) category of NFVI network functions. More specifically, the fifth level nodes 410 may refer to a plurality of nodes corresponding to types of containerized virtual network functions that are managed by a cluster (e.g., a Kubernetes cluster) on the corresponding deployment area. Examples of the fifth level nodes include an access and mobility management function (AMF) node, a session management function (SMF) node, user plane function (UPF) node, and any additional nodes corresponding to containerized network function types.

As noted above, each of the nodes illustrated in FIG. 4 are provided by way of example and different deployment area branches may include similar or different branches of nodes corresponding to similar or different types of network functions and associated configurations. Moreover, as discussed herein, each of the nodes may include configuration instructions that are specific to the deployment area, and which may differ (or be similar) to nodes that reference similar network function types that are contained in other deployment area branches.

Figure 5:
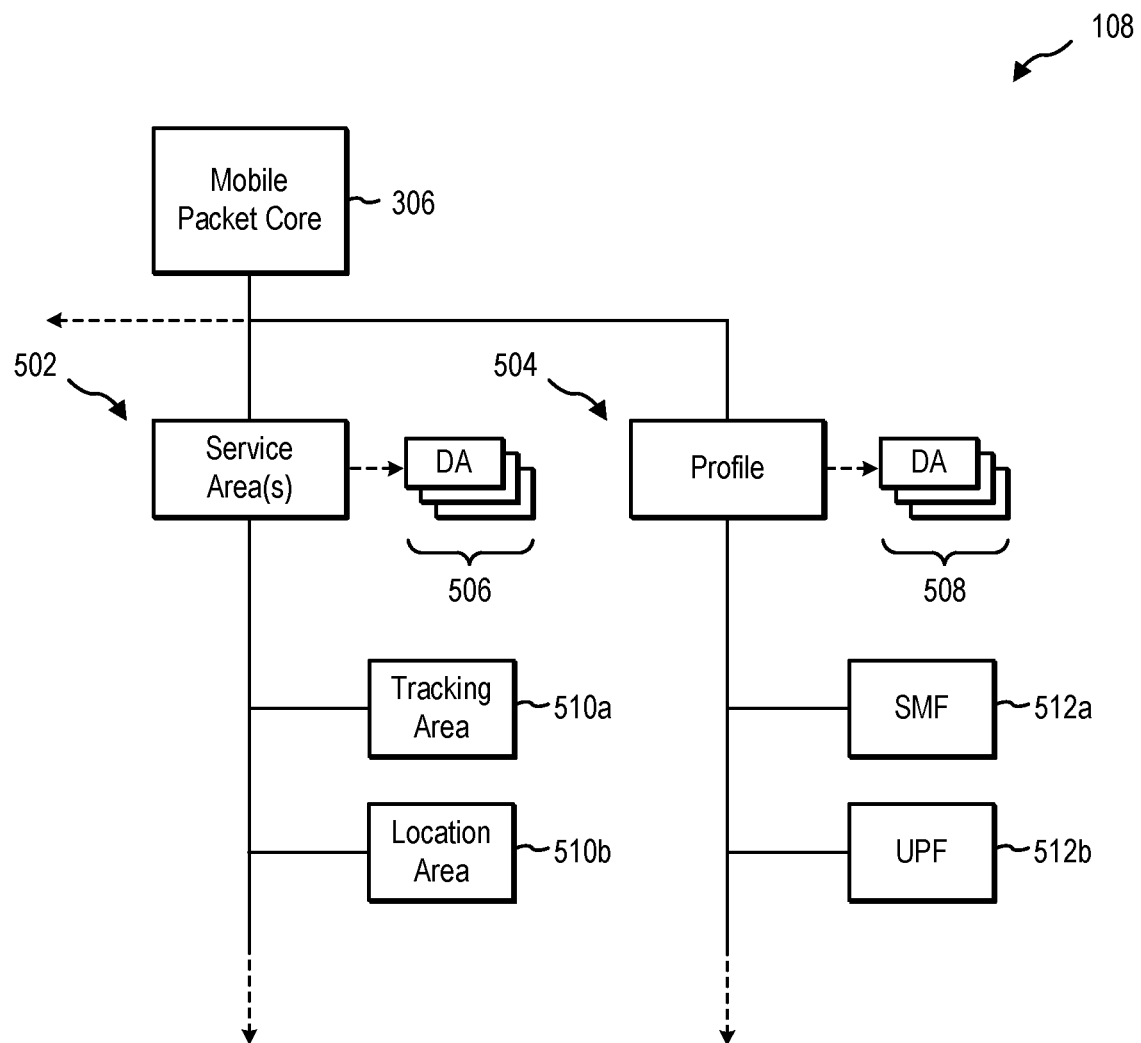
FIG. 5 illustrates additional example branches of a hierarchical configuration model in accordance with one or more embodiments.

Additional information will now be discussed in connection with an example set of configuration management branches of the hierarchical configuration model 108. For example, FIG. 5 illustrates a first example configuration management branch 502 and a second example configuration management branch 504. As shown in FIG. 5, the hierarchical configuration model 108 may include the top node 306 (e.g., a mobile packet core). As shown in FIG. 5, each of the configuration management branches 502-504 are child branches of the top node 306. For ease in explanation, FIG. 5 illustrates two configuration management nodes. Nevertheless, the hierarchical configuration model 108 may include any number of configuration management nodes having corresponding sets of nodes associated therewith. As such, features and functionalities described in connection with the example branches shown in FIG. 5 may apply to other configuration management branches not explicitly shown herein.

In each of the configuration management branches 502-504, one or more of the nodes that make up the branches may be associated with deployment area indicators that point to one or more deployment areas. For example, a second level node of the first configuration management branch 502 may include a first set of indicator(s) 506 that point to one or multiple deployment branches of the hierarchical configuration model 108. Similarly, a second level node of the second configuration management branch 504 may include a second set of indicator(s) 508 that point to one or multiple deployment branches of the hierarchical configuration model 108. Some or all of the points to the different deployment area branches may differ between the configuration management branches as may serve a particular embodiment.

In the illustrated example, the first configuration management branch 502 may refer to a service area branch. In one or more embodiments, the service area branch 502 is associated with a particular service area, and may be applied to any set of network functions that fall within a particular service area. As an example, a deployment request may indicate a set of network functions with a responsibility over a specific service area (e.g., a RAN coverage area or specified geographic area). This service area may be referenced by a service area node, which may include points to specific deployment branches that are included within the indicated service area. This service area and associated deployment area points may provide a filtering mechanism that instructs the configuration management system 106 to deploy network functions tasked with providing services or resources to deployment areas that fall within the indicated service area while also instructing the configuration management system 106 to avoid deploying network functions at deployment areas that do not fall within the indicated service area.

As further shown in FIG. 5, the service area node may include one or more lower-level nodes that provide additional configuration management instructions to network functions and other services that fall within the hierarchy of the first configuration management branch 502. For example, a first third-level node in the first configuration management branch 502 may include a tracking area node including tracking area instructions applicable to network functions deployed within the indicated service area (and identified deployment areas). As another example, a second third-level level node in the first configuration management branch 502 may include a location area node including location area instructions applicable to network functions deployed within the indicated service area.

While not explicitly shown in FIG. 5, each of the nodes may include further instructions limiting application of the configuration management instructions to specific types of network functions on the indicated deployment areas. As an example, the first third-level node 510a may include an instruction limiting application of configuration management instructions of the respective node to a first category of network functions while the second third-level node 510b may include an instruction limiting application of configuration management instructions of the respective node to a second category of network functions.

As shown in FIG. 5, the second configuration management branch 504 may refer to a profile branch. Similar to the first configuration management branch 504, the profile branch (and/or individual nodes within the branch) may be associated with one or more deployment areas. For example, as shown in FIG. 5, the profile node of the second configuration management branch 502 may include a set of indicators 508 pointing to one or more corresponding deployment area branches of the hierarchical configuration model 108. Lower-level nodes may similarly include pointers to specific deployment area branches of the hierarchical configuration model 108.

As shown in FIG. 5, the profile node may include lower-level nodes including configuration management functions to be applied to particular profiles of network functions. By way of example, the lower-level nodes may include an SMF profile node 512a including configuration instructions that may be applied to the SMF profile of SMF network functions. As further shown, the lower-level nodes may include a UPF profile node 512b including configuration instructions that may be applied to the UPF profile of UPF network functions.

The above configuration management branches are provided by way of example and are not intended to be limiting in scope to the specific types of configuration management instructions described and illustrated herein. For example, additional configuration management branches may include routing configuration branches, 3G branch protocols, 4G branch protocols, 5G branch protocols, network slice branches, and any other branches that may provide specific configuration management instructions that may be applied to network functions on various deployment areas.

As noted above, each of the nodes of the hierarchical configuration model 108 may be modified over time based on changing computational requirements, security policies, or addition of new network function types that may be deployed on the cloud computing system 102. Moreover, one or more nodes may be removed or added to provide a dynamic telecommunications network on the cloud computing system 102 with services that can be enhanced and expanded over time within the framework provided by the hierarchical configuration model 108.

Additional information will now be given in connection with various example workflows in which the systems described herein (e.g., the configuration management system 106 and/or reconciliation agents 114) cooperatively perform multi-tiered reconciliation checks to determine whether a deployment has maintained consistency over time and/or whether the deployment includes one or more variations from a goal configuration state generated and provided by the configuration management system 106. More specifically, FIGS. 6A-6B illustrates example workflows showing series of acts that may be performed by the respective systems while showing the asynchronous nature in which the systems reconcile a current configuration state with a goal configuration state. It will be understood that one or more embodiments described herein specifically refer to configuration states that are generated and deployed based on deployment information contained within examples of the hierarchical configuration model 108 described above.

Figure 6A:
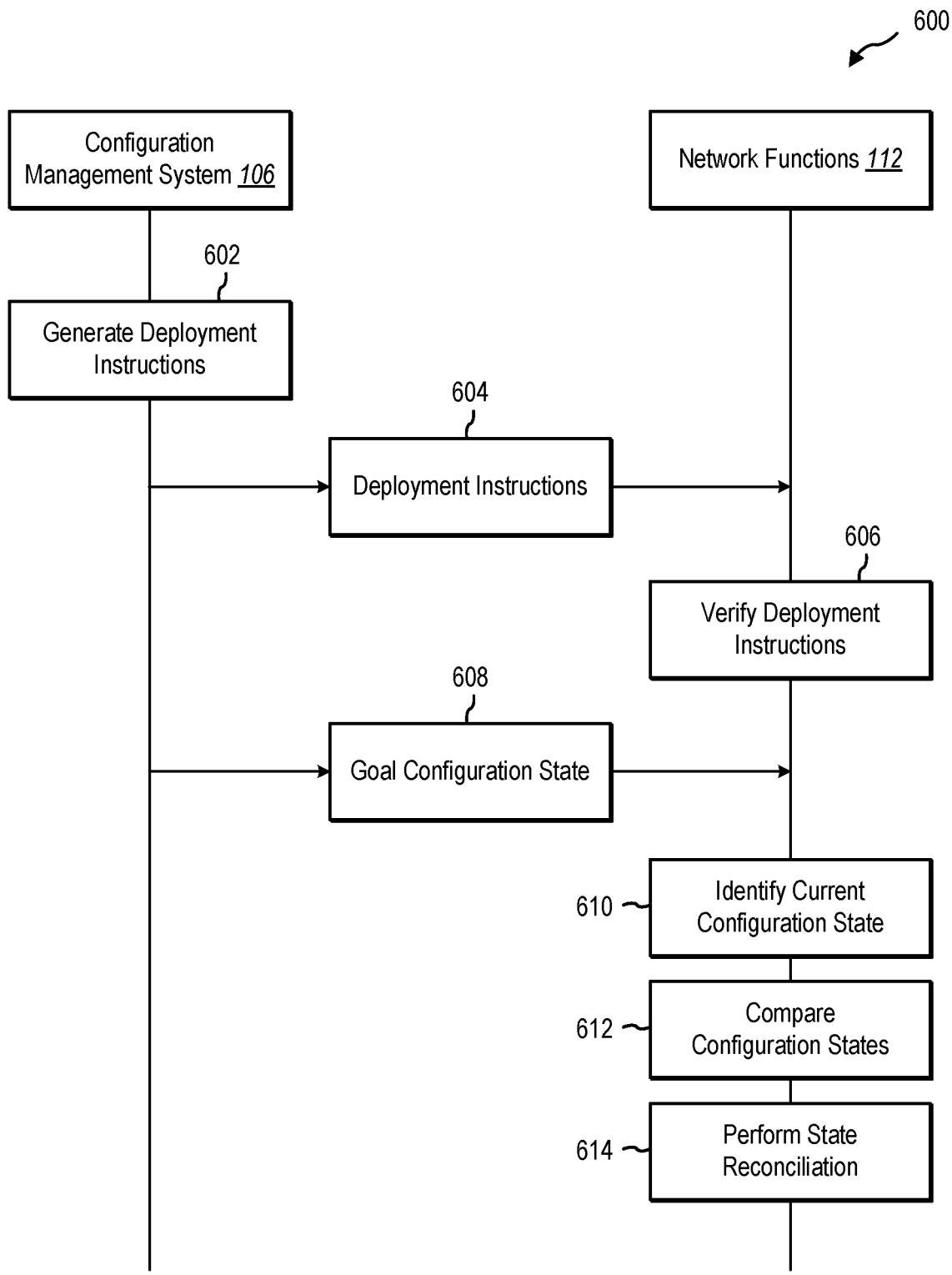
FIGS. 6A-6B illustrates an example implementation in which a configuration management system and network function coordinate asynchronous performance of multi-tiered reconciliation of a configuration state for a network function.
Figure 6B:
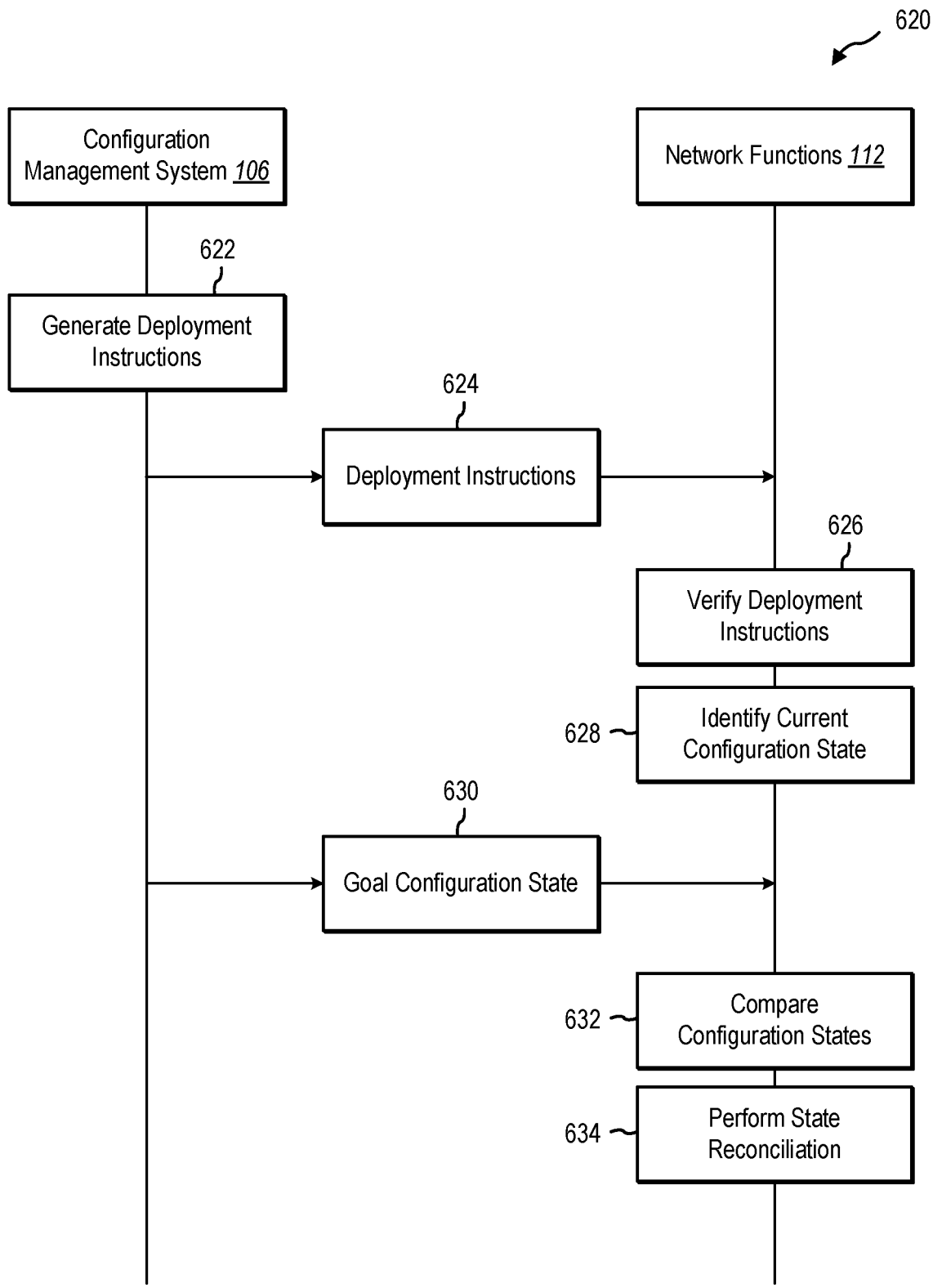

As a first example, FIG. 6A illustrates an example workflow 600 showing a series of interactions between a configuration management system 106 and network function(s) 112 (e.g., the reconciliation agent 114 on the network function 112) in accordance with one or more embodiments described herein. In particular, the workflow 600 shows an example set of interactions in which the configuration management system 106 and network function 112 perform multiple levels of asynchronous reconciliation checks to determine whether a current configuration state of the network function 112 matches a goal configuration state previously provided by the configuration management system 106. The workflow 600 shown in FIG. 6A may apply to interactions between the configuration management system 106 and one or multiple network functions 112.

As shown in FIG. 6A, the configuration management system 106 may perform an act 602 of generating deployment instructions. This act 602 of generating deployment instructions may include receiving a deployment request and applying the hierarchical configuration model 108 to the deployment request in accordance with examples described above. Indeed, the act 602 of generating deployment instructions may involve the acts related to filtering, mapping, and parameterizing the configuration management instructions for the network function 112 based on a deployment area of the network function 112 as well as any additional configuration instructions referenced within the hierarchical configuration model 108.

As further shown in FIG. 6A, the configuration management system 106 may perform an act 604 of providing deployment instructions to the network function(s) 112. In accordance with one or more embodiments described above, the act 604 of providing the deployment instructions may refer to a fanout stage of deployment in which the configuration management system 106 iterates configuration management instructions across any number of network functions based on deployment areas and/or quantities of network functions indicated in a deployment request and referenced by nodes of the hierarchical configuration model 108. In one or more embodiments, the deployment instructions may include a declarative state of the deployment. For example, the deployment instructions may be delivered as a declaration of intent to be carried out in accordance with a schedule determined by the network function 112.

In one or more embodiments, the goal state(s) is expressed as one or more create, read, update, delete (CRUD) operations. As illustrative examples, a declaration of intent may be a statement of intent for there to be a mobile packet core. Another example may include a statement of intent for an MPC to be deployed on a particular deployment area. Another example may include a statement of intent for a deployment area to have network functions of a particular type and number to be running thereon. Another example may include a statement of intent to have an AMF running on one or more server nodes. Indeed, generating and delivering a goal state may be thought of as a customer registering a state of intent for a particular deployment.

As shown in FIG. 6A, the network function 112 may perform an act 606 of verifying the deployment instructions. For example, the network function 112 may determine whether the deployment instructions include a valid request or a valid statement of intent that can be read and understood by the network function 112. In one or more embodiments, the network function 112 performs the verification by simply determining that the deployment instructions have a proper format that the network function 112 is configured to read and process.

In addition to generally determining that the deployment instructions are valid (e.g., that the instructions are properly format and can be read), the network function 112 may additionally determine whether the deployment instructions violate any rules applicable to the network function 112. For example, the network function 112 may perform one or more cross-instance validation checks to determine whether the declared intent violates one or more configurations previously deployed or yet to be deployed on the network function 112 or other network functions within a shared computing environment of the network function 112. As an illustrative example, where the deployment instructions include a request to create AMF instances that would occupy fifty servers, but where only thirty servers are available, the network function 112 may determine that the deployment instructions will fail even if the instructions include a request that is otherwise valid (e.g., even if the instructions comply with a required API format and which follow the format of the hierarchical configuration model 108).

In the example shown in FIG. 6A, the network function 112 may perform an act 608 of receiving a goal configuration state. As noted above, the goal configuration state includes a declaration of intent generated in response to a deployment request and based on application of the hierarchical configuration model 108 to the deployment request. The goal configuration state provides an indication to the network function 112 as to what a configuration should look like based on the received deployment request (and based on information contained in the hierarchical configuration model 108).

In this example, the network function performs an act 610 of identifying a current configuration state of the network function 112. In one or more embodiments, this act 610 involve analyzing the configuration state that is currently active or otherwise in-effect on the network function 112. Alternatively, where the deployment instructions have yet to be implemented or injected within an instance of the network function 112, the act 610 of identifying the current configuration state may involve determining that the network function 112 yet to be configured.

In either example, whether the configuration state has been previously implemented or is yet to be implemented, the network function 112 may determine a current configuration state. In addition, as noted above, the act 608 of providing the goal configuration state and the act 610 of identifying the current configuration state may be performed independent from one another without consideration of a timing of when the other configuration state was generated, provided, and/or identified. While the workflow 600 shown in FIG. 6A shows an example where a single instance of the goal configuration state is provided to the network function 112, other implementations may involve the goal configuration state being generated and provided multiple times before performing additional acts 610-614.

As further shown in FIG. 6A, the network function 112 may perform an act 612 of comparing the configuration states. More specifically, the network function 112 may compare the goal configuration state with the identified current configuration state to determine whether the configuration states correspond to one another (e.g., whether the configuration states match).

In one or more embodiments, the network function 112 compares the most recent known configuration states. For example, the network function 112 may compare a most recently received goal configuration state with a most recently identified current configuration state. In this manner, the network function 112 may compare the latest known configuration states to ensure accuracy in the data that is being compared to determine whether one or more mitigation actions are necessary.

As shown in FIG. 6A, the network function 112 may perform an act 614 of performing state reconciliation. In particular, the network function 112 may reconcile the configuration states based on the determination of whether the goal configuration state and the current configuration state match. For example, where the configuration states match, performing the state reconciliation may involve performing no additional actions.

Alternatively, where the configuration states do not match, the act 614 of performing state reconciliation may involve performing any number of mitigation actions to cause the current configuration state for the network function 112 to match the goal configuration state received from the configuration management system 106. In one or more embodiments, this may involve modifying one or more parameters of a configuration. In one or more embodiments, this may involve requesting re-delivery of deployment instructions from the configuration management system 106 (e.g., in an example where there is a failure of a network function and a current configuration state indicates absence of a configuration and/or running network function instance). In one or more embodiments, this may involve simply causing the network function to run in accordance with the previously received configuration management instructions that have yet to be instantiated on a network function.

As indicated above, FIG. 6B illustrates another example workflow 620 showing a similar series of acts that can be performed by the configuration management system 106 and network function 112 in carrying out a multi-tiered reconciliation of a goal configuration state and current configuration state on one or more network functions 112. Similar to the example workflow 600 shown in FIG. 6A, the workflow 620 shown in FIG. 6A shows an example set of interactions in which the configuration management system 106 and network function 112 perform multiple levels of asynchronous reconciliation checks to determine whether a current configuration state of the network function 112 matches a goal configuration state previously provided by the configuration management system 106.

As shown in FIG. 6B, the configuration management system 106 may perform an act 622 of generating deployment instructions. The configuration management system 106 may additionally perform an act 624 of providing deployment instructions to the network function 112. The network function 112 may further perform an act 626 of verifying the deployment instructions. The acts 622-626 shown in FIG. 6B may include similar features and functionality as corresponding acts 602-606 discussed above in connection with FIG. 6A.

As further shown in FIG. 6B, the network function 112 may perform an act 628 of identifying a current configuration state for the network function 112. The acts 628 of identifying the current configuration state may include features as the act 610 of identifying the current configuration state discussed above in connection with FIG. 6A. In contrast to FIG. 6A, however, the act 628 of identifying the current configuration state may be performed prior to receiving and/or confirming receipt of the goal configuration state. Indeed, while FIG. 6B illustrates an example workflow 610 including a single instance of identifying the current configuration state, the network function 112 may perform the act 628 of identifying the current configuration state any number of times prior to receiving a goal configuration state.

As shown in FIG. 6B, configuration management system 106 may perform an act 630 of providing the goal configuration state to the network function 112. As discussed above, the act 630 of generating and/or providing the goal configuration state to the network function 112 is performed independent from and asynchronously from the act 628 of identifying the current configuration state. The act 630 of providing the goal configuration state may include similar features and functionality as the act 608 discussed above in connection with FIG. 6A.

As shown in FIG. 6B, the network function 112 may perform an act 632 of comparing the configuration states. The network function 112 may additionally perform an act 634 of performing state reconciliation. The acts 632-634 may include similar features and functionality as the corresponding acts 612-614 discussed above in connection with FIG. 6A.

Figure 7:
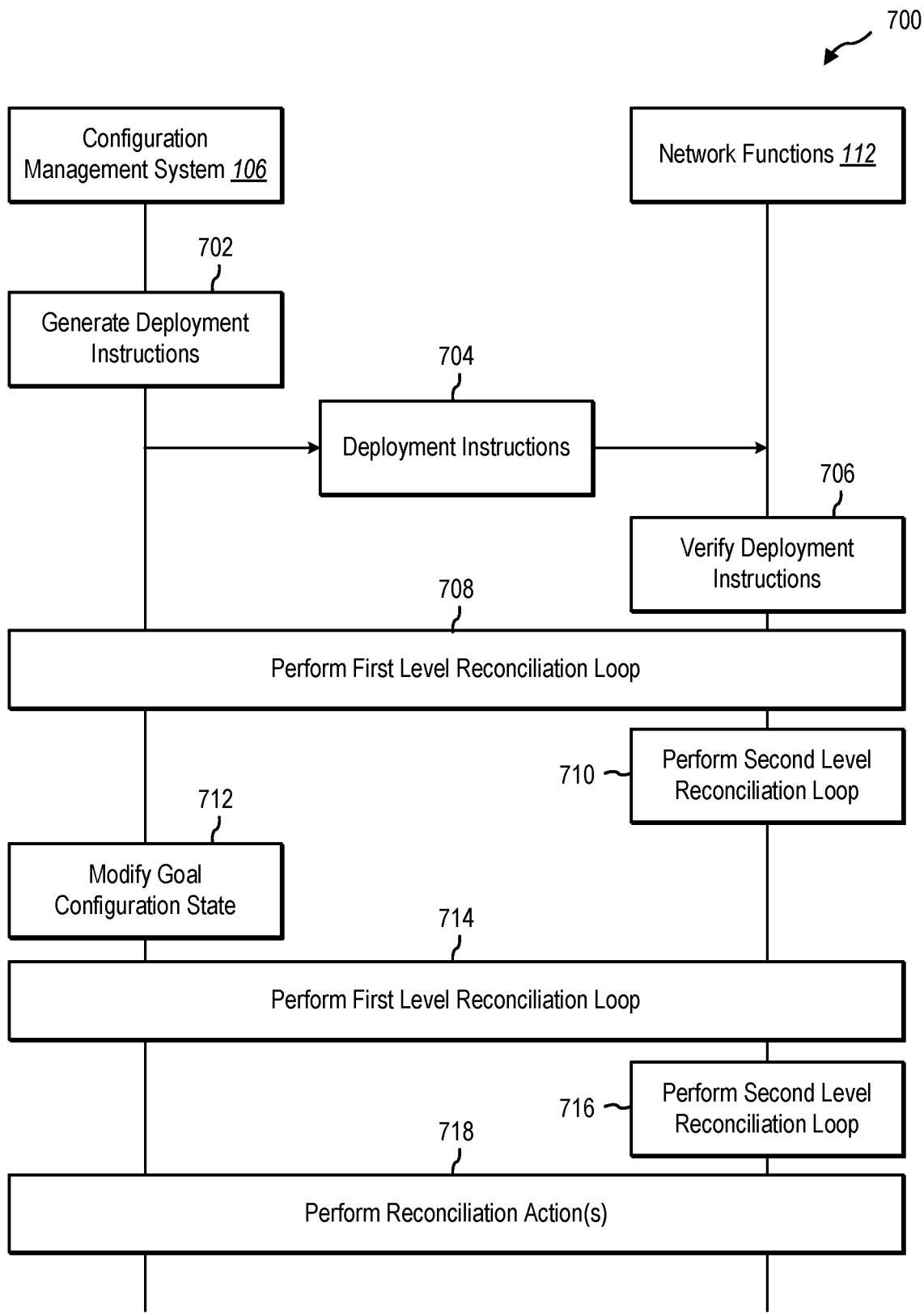
FIG. 7 illustrates another example implementation for performance of multi-tiered reconciliation of a configuration state for a network function.

FIG. 7 illustrates another example implementation of one or more embodiments described herein. In particular, FIG. 7 illustrates an example workflow 700 including a series of acts that can be performed by the configuration management system 106 and network functions 112 in carrying out a multi-tiered reconciliation of a goal configuration state and a goal configuration state on one or across multiple network functions 112. It will be appreciated that the workflow 700 may include similar features as discussed above in connection with the example workflows illustrated and discussed in connection with FIGS. 6A-6B.

As shown in FIG. 7, the configuration management system 106 may perform an act 702 of generating deployment instructions. The configuration management system 106 may additionally perform an act 704 of providing deployment instructions. The network function 112 may perform an act 706 of verifying the deployment instructions. Each of the acts 702-706 may include similar features and functionality as corresponding acts discussed above (e.g., as shown and discussed in connection with FIGS. 6A-6B).

As shown in FIG. 7, the systems (e.g., the configuration management system 106 and reconciliation agent on the network function 112) may perform 708 a first level reconciliation loop. As further shown, the network function 112 (e.g., the reconciliation agent on the network function 112) may perform 710 a second level reconciliation loop.

Similar to one or more embodiments described herein, the first level reconciliation loop may include acts related to performing a first level reconciliation check. For example, the first level reconciliation loop may involve generating an delivering a goal configuration state to the network function 112. Further, the first level reconciliation loop may involve verifying or otherwise confirming that the goal configuration state has been successfully delivered (e.g., received) by the network function 112. In addition to verifying that a goal state has been delivered, the first level reconciliation loop may further involve determining that the goal state hasn't drifted or otherwise been corrupted. For instance, the first level reconciliation loop may include a combination of determining that a goal state has been successfully delivered and remains unmodified and/or uncorrupted.

Also similar to one or more embodiments described herein, the second level reconciliation loop may involve acts performed by the network function 112 in connection with generating and utilizing the current configuration state to reconcile the current configuration state with the goal configuration state received from the configuration management system 106. For example, the second level reconciliation loop may involve generating any number of instances of the current configuration state for the network function. The second level reconciliation loop may further include comparing the configuration states to determine whether the current configuration state matches or otherwise corresponds to the previously received goal configuration state. Furthermore, the second level reconciliation loop may include determining and carrying out any acts of mitigation or reconciliation to cause the current configuration state to reconcile (e.g., match) the goal configuration state. In some implementations, the second level reconciliation loop may involve determining that the configuration states cannot be reconciled without further intervention (e.g., by an administrator of the cloud computing system 102).

In addition, while FIG. 7 illustrates an example in which the first reconciliation loop is performed prior to performing the second level reconciliation loop, it will be appreciated that these reconciliation loops are asynchronous. For example, while the first level reconciliation loop may be performed prior to performing the second level reconciliation loop, one or more implementations include performing the second level reconciliation loop prior to performing the first level reconciliation loop. Moreover, in some implementations, the first level reconciliation loop is performed multiple times without performing an instance of the second level reconciliation loop. Alternatively, in some implementations, the second level reconciliation loop is performed multiple timers without performing an instance of the first level reconciliation loop.

As further shown in FIG. 7, the workflow may include additional acts related to reconciling changes in a goal configuration state. For example, as shown in FIG. 7, the configuration management system 106 may perform an act 712 of causing modification to a goal configuration state for the network function 112. This may occur for a variety of reasons. For example, where the hierarchical configuration model 108 is modified, this may cause a modification to a goal configuration state. As another example, where the configuration management system 106 receives a new or modified deployment request that references other portions of the hierarchical configuration model 108, this may result in a modification of the goal configuration state that is applicable to the network function 112. Indeed, the goal configuration state may be modified in a variety of ways.

As shown in FIG. 7, the systems may perform additional instances of the reconciliation loops pursuant to modification of the goal configuration state. For example, the systems may perform an act 714 of a first level reconciliation loop. In addition, the systems (e.g., the network function 112) may perform an act 716 of a second level reconciliation loop. These acts 714-716 of performing the reconciliation loops may include similar features and functionality as the acts 708-710 discussed above. Similar to corresponding acts of performing reconciliation loops, these reconciliation loops may similarly be performed asynchronously or otherwise independent from one another.

As shown in FIG. 7, the systems may perform 718 one or more reconciliation action(s). In this example, the modified goal configuration state would be different from the determined current configuration state, thus the network function 112 and/or the configuration management system 106 may cooperatively perform one or more reconciliation actions to cause the current configuration state to match the modified goal configuration state applicable to the network function 112. This may involve modifying a deployment, re-deploying an instance of the network function 112, or escalating an issue to an administrator of the cloud computing system 102 to perform mitigation of the network function 112 in an attempt to reconcile the configuration state of the network function 112.

Figure 8:
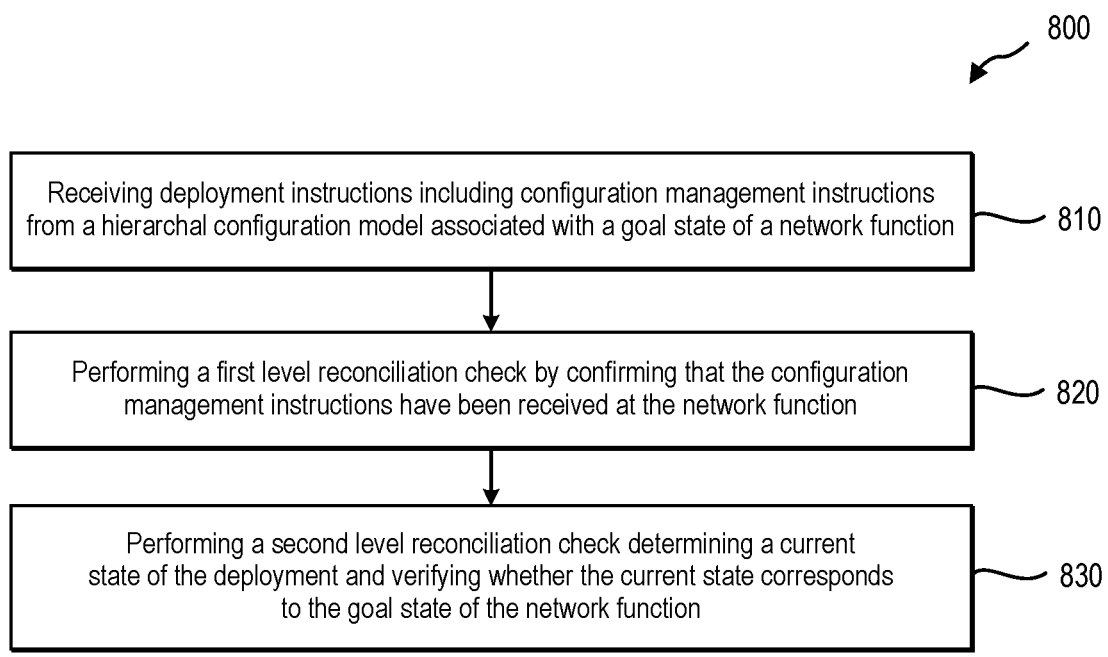
FIG. 8 illustrates an example series of acts for managing deployment of a network function and reconciling a configuration state in accordance with one or more embodiments.
Figure 9:
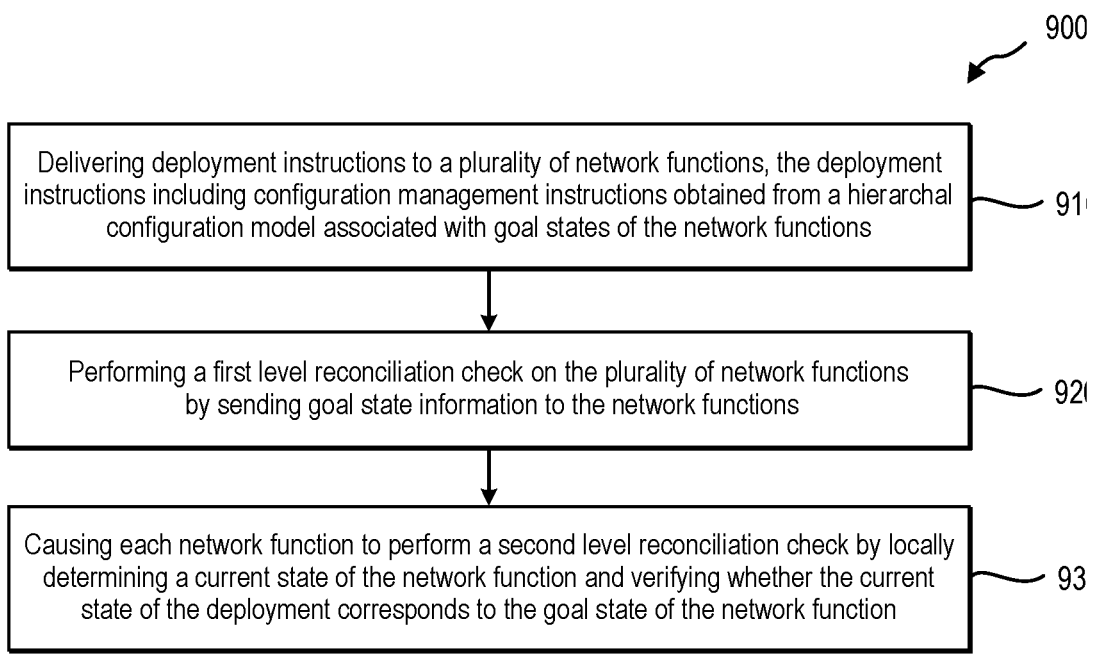
FIG. 9 illustrates another example series of acts for managing deployment of a network function and reconciling a configuration state in accordance with one or more embodiments.

Turning now to FIGS. 8-9, these figures illustrate example flowcharts including series of acts for performing multi-tiered reconciliation of configuration states for network functions of a telecommunications network. While FIGS. 8-9 illustrate acts according to one or more embodiments, alternative embodiments may omit, add to, reorder, and/or modify any of the acts shown in FIGS. 8-9. The acts of FIGS. 8-9 can be performed as part of a method. Alternatively, a non-transitory computer-readable medium can comprise instructions that, when executed by one or more processors, cause a computing device to perform the acts of FIGS. 8-9. In still further embodiments, a system can perform the acts of FIGS. 8-9.

As noted above, FIG. 8 illustrates a series of acts 800 for managing and maintaining deployments of configurations on network functions in a telecommunications network. As shown in FIG. 8, the series of acts 800 includes an act 810 of receiving deployment instructions including configuration management instructions from a hierarchical configuration model associated with a goal state of a network function. In one or more embodiments, the act 810 includes receiving, at a network function, deployment instructions associated with deployment of the network function on the telecommunications network, the deployment instructions including configuration management instructions associated with a goal state of a deployment of the network function, the configuration management instructions being obtained from a hierarchical configuration model.

As shown in FIG. 8, the series of acts 800 includes an act 820 of performing a first level reconciliation check by confirming that the configuration management instructions have been received at the network function. In one or more embodiments, the act 820 includes performing a first level reconciliation check for the network function by confirming that the configuration management instructions associated with the goal state of the deployment have been received at the network function.

As shown in FIG. 8, the series of acts 800 includes an act 830 of performing a second level reconciliation check determining a current state of the deployment and verifying whether the current state corresponds to the goal state of the network function. In one or more embodiments, the act 830 includes performing a second level reconciliation check for the network function by determining a current state of the deployment on the network function and verifying whether the current state of the deployment corresponds to the goal state of the network function.

In one or more embodiments, the first level reconciliation check and the second level reconciliation check are performed asynchronously. In one or more embodiments, the deployment instructions include a declarative set of instructions associated with non-imperative statements of intent to implement the configuration management instructions on the network function. In one or more embodiments, performing the second level reconciliation check further comprises locally issuing, by the network function, a command to implement the configuration instructions associated with the goal state.

In one or more embodiments, performing the second level reconciliation check includes determining that the current state does not match the goal state. In one or more embodiments, the series of acts 800 further includes reconfiguring the network function in accordance with the configuration management instructions associated with the goal state to cause the current state of the network function to match the goal state. The series of acts 800 may further (e.g., alternatively) include determining that a mitigation action to change the current state of the network function to the goal state is not available and generating a report indicating that the current state does not match the goal state.

In one or more embodiments, the series of acts includes performing a validation check upon receiving the deployment instructions. The validation check may include determining that the deployment instructions are based on a valid deployment request. The validation check may further include determining that the deployment instructions do not violate one or more internal validity checks.

In one or more embodiments, performing the second level reconciliation check is performed by a local agent of the network function. Further, in one or more embodiments, the network function is deployed in a core mobile network of a fifth generation (5G) telecommunications network.

FIG. 9 illustrates a series of act 900 related to managing and maintaining deployments of configurations on network functions in a telecommunications network. As shown in FIG. 9, the series of acts 900 includes an act of delivering deployment instructions to a plurality of network functions, the deployment instructions including configuration management instructions obtained from a hierarchical configuration model associated with goal states of the network functions. In one or more implementations, the act 910 includes delivering deployment instructions to a plurality of network functions implemented on a telecommunications network, the deployment instructions including configuration management instructions associated with goal states of deployments of the plurality of network functions, the configuration management instructions being obtained from a hierarchical configuration model.

As further shown in FIG. 9, the series of acts 900 includes an act 920 of performing a first level reconciliation check on the plurality of network functions by sending goal state information to the network functions. In one or more implementations, the act 920 includes performing a first level reconciliation check on the plurality of network functions by sending goal state information to the plurality of network functions.

As further shown in FIG. 9, the series of acts 900 includes an act 930 of causing each network function to perform a second level reconciliation check by locally determining a current state of the network function and verifying whether the current state of the deployment corresponds to the goal state of the network function. In one or more implementations, the act 930 includes causing each network function of the plurality of network functions to perform a second level reconciliation check by locally determining a current state of a deployment on the network function and verifying whether the current state of the deployment corresponds to a goal state of the network function.

In one or more embodiments, the deployment instructions are based on a deployment request, the deployment request including an application programming interface (API) call that references branches of the hierarchical configuration model associated with respective deployment areas of the telecommunications network. In one or more embodiments, the deployment instructions include a declarative set of instructions associated with non-imperative statements of intent to implement the configuration management instructions on the plurality of network functions.

In one or more embodiments, the first level reconciliation check and the second level reconciliation check are performed asynchronously. In one or more embodiments, each network function of the plurality of network functions has a local agent that performs the second level reconciliation check. In one or more embodiments, performing the second reconciliation check includes determining that the current state does not match the goal state, and wherein the method further comprises reconfiguring the network function in accordance with the configuration management instructions associated with the goal state to cause the current state of the network function to match the goal state.

Figure 10:
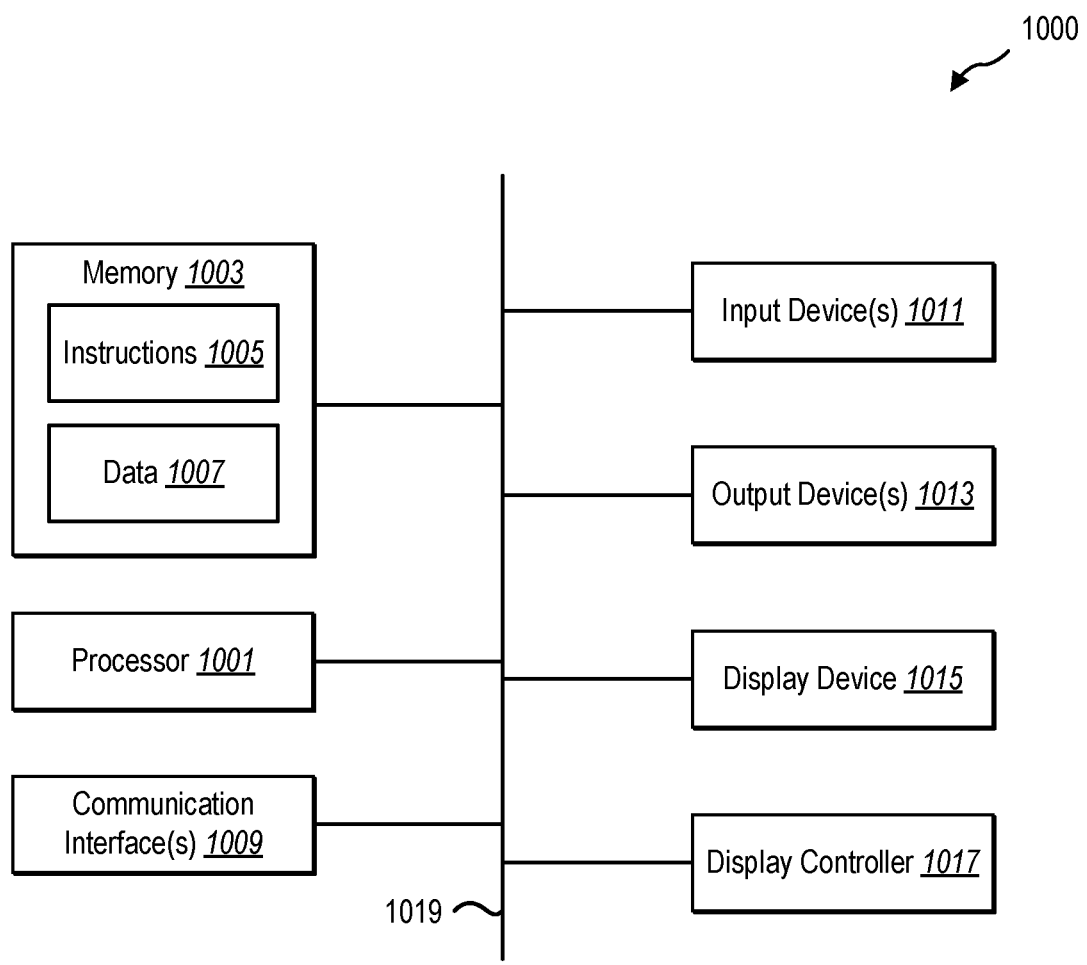
FIG. 10 illustrates certain components that may be included within a computer system.

FIG. 10 illustrates certain components that may be included within a computer system 1000. One or more computer systems 1000 may be used to implement the various devices, components, and systems described herein.

The computer system 1000 includes a processor 1001. The processor 1001 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1001 may be referred to as a central processing unit (CPU). Although just a single processor 1001 is shown in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1005 and data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during execution of the instructions 1005 by the processor 1001.

A computer system 1000 may also include one or more communication interfaces 1009 for communicating with other electronic devices. The communication interface(s) 1009 may be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1000 may also include one or more input devices 1011 and one or more output devices 1013. Some examples of input devices 1011 include a keyboard, mouse, microphone, remote control device, button, joystick, trackball, touchpad, and light pen (or light-sensitive wand). Some examples of output devices 1013 include a speaker and a printer. One specific type of output device that is typically included in a computer system 1000 is a display device 1015. Display devices 1015 used with embodiments disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For the sake of clarity, the various buses are illustrated in FIG. 10 as a bus system 1019.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for managing and maintaining deployments of configurations on network functions in a telecommunications network, the method comprising:
   receiving, at a network function, deployment instructions associated with deployment of the network function on the telecommunications network, the deployment instructions including configuration management instructions associated with a goal state of a deployment of the network function, the configuration management instructions being obtained from a hierarchical configuration model;
   performing a first level reconciliation check for the network function by confirming that the configuration management instructions associated with the goal state of the deployment have been received at the network function; and
   performing a second level reconciliation check for the network function by determining a current state of the deployment on the network function and verifying whether the current state of the deployment corresponds to the goal state of the network function.

2. The method of claim 1, wherein the first level reconciliation check and the second level reconciliation check are performed asynchronously.

3. The method of claim 1, wherein the deployment instructions include a declarative set of instructions associated with non-imperative statements of intent to implement the configuration management instructions on the network function.

4. The method of claim 3, wherein performing the second level reconciliation check further comprises locally issuing, by the network function, a command to implement the configuration management instructions associated with the goal state.

5. The method of claim 1, wherein performing the second level reconciliation check includes determining that the current state does not match the goal state.

6. The method of claim 5, further comprising reconfiguring the network function in accordance with the configuration management instructions associated with the goal state to cause the current state of the network function to match the goal state.

7. The method of claim 5, further comprising:
   determining that a mitigation action to change the current state of the network function to the goal state is not available; and
   generating a report indicating that the current state does not match the goal state.

8. The method of claim 1, further comprising performing a validation check upon receiving the deployment instructions, the validation check including:
   determining that the deployment instructions are based on a valid deployment request; and
   determining that the deployment instructions do not violate one or more internal validity checks.

9. The method of claim 1, wherein performing the second level reconciliation check is performed by a local agent of the network function.

10. The method of claim 1, wherein the network function is deployed in a core mobile network of a fifth generation (5G) telecommunications network.

11. A method for managing and maintaining deployments of configurations on network functions in a telecommunications network, the method comprising:
- delivering deployment instructions to a plurality of network functions implemented on a telecommunications network, the deployment instructions including configuration management instructions associated with goal states of deployments of the plurality of network functions, the configuration management instructions being obtained from a hierarchical configuration model;
- performing a first level reconciliation check on the plurality of network functions by sending goal state information to the plurality of network functions; and
- causing each network function of the plurality of network functions to perform a second level reconciliation check by locally determining a current state of a deployment on the network function and verifying whether the current state of the deployment corresponds to a goal state of the network function.

12. The method of claim 11, wherein the deployment instructions are based on a deployment request, the deployment request including an application programming interface (API) call that references branches of the hierarchical configuration model associated with respective deployment areas of the telecommunications network.

13. The method of claim 11, wherein the deployment instructions include a declarative set of instructions associated with non-imperative statements of intent to implement the configuration management instructions on the plurality of network functions.

14. The method of claim 11, wherein the first level reconciliation check and the second level reconciliation check are performed asynchronously.

15. The method of claim 11, wherein each network function of the plurality of network functions has a local agent that performs the second level reconciliation check.

16. The method of claim 11, wherein performing the second level reconciliation check includes determining that the current state does not match the goal state, and wherein the method further comprises reconfiguring the network function in accordance with the configuration management instructions associated with the goal state to cause the current state of the network function to match the goal state.

17. A system, comprising:
- at least one processor;
- memory in electronic communication with the at least one processor; and
- instructions stored in the memory, the instructions being executable by the at least one processor to:
  - receive, at a network function, deployment instructions associated with deployment of the network function on a telecommunications network, the deployment instructions including configuration management instructions associated with a goal state of a deployment of the network function, the configuration management instructions being obtained from a hierarchical configuration model;
  - perform a first level reconciliation check for the network function by confirming that the configuration management instructions associated with the goal state of the deployment have been received at the network function; and
  - perform a second level reconciliation check for the network function by determining a current state of the deployment on the network function and verifying whether the current state of the deployment corresponds to the goal state of the network function.

18. The system of claim 17, wherein the first level reconciliation check and the second level reconciliation check are performed asynchronously.

19. The system of claim 17, wherein the deployment instructions include a declarative set of instructions associated with non-imperative statements of intent to implement the configuration management instructions on the network function, and wherein performing the second level reconciliation check further comprises locally issuing, by the network function, a command to implement the configuration management instructions associated with the goal state.

20. The system of claim 17, wherein the network function is deployed in a core mobile network of a fifth generation (5G) telecommunications network.

* * * * *